US009129010B2

(12) United States Patent
Ash et al.

(10) Patent No.: US 9,129,010 B2
(45) Date of Patent: Sep. 8, 2015

(54) SYSTEM AND METHOD OF PARTITIONED LEXICOGRAPHIC SEARCH

(75) Inventors: Stephen M. Ash, Cordova, TN (US); Jerry H. Bowman, Germantown, TN (US)

(73) Assignee: ARGO DATA RESOURCE CORPORATION, Richardson, TX (US)

( * ) Notice: Subject to any disclaimer, the term of this patent is extended or adjusted under 35 U.S.C. 154(b) by 483 days.

(21) Appl. No.: 13/108,476

(22) Filed: May 16, 2011

(65) Prior Publication Data

US 2012/0296913 A1 Nov. 22, 2012

(51) Int. Cl.
G06F 17/30 (2006.01)

(52) U.S. Cl.
CPC .............................. *G06F 17/30619* (2013.01)

(58) Field of Classification Search
CPC .................... G06F 17/30011; G06F 17/30619
See application file for complete search history.

(56) References Cited

U.S. PATENT DOCUMENTS

| 5,799,299 | A  | * | 8/1998  | Fujiwara ........................... 1/1 |
| 6,049,819 | A  | * | 4/2000  | Buckle et al. ................ 709/202 |
| 6,119,124 | A  |   | 9/2000  | Broder et al. |
| 6,374,241 | B1 |   | 4/2002  | Lamburt et al. |
| 6,393,415 | B1 |   | 5/2002  | Getchius et al. |
| 7,685,093 | B1 |   | 3/2010  | Adams et al. |
| 7,716,229 | B1 |   | 5/2010  | Srivastava et al. |
| 7,814,107 | B1 |   | 10/2010 | Thirumalai et al. |
| 7,917,492 | B2 | * | 3/2011  | Bargeron et al. ............. 707/708 |
| 8,478,740 | B2 | * | 7/2013  | Gherman et al. ............. 707/715 |
| 8,572,062 | B2 | * | 10/2013 | Felderman et al. ........... 707/706 |
| 2002/0156760 | A1 | * | 10/2002 | Lawrence et al. ................ 707/1 |
| 2003/0059818 | A1 | * | 3/2003 | Domany et al. .................... 435/6 |
| 2004/0260694 | A1 | * | 12/2004 | Chaudhuri et al. ............... 707/5 |
| 2005/0267871 | A1 | * | 12/2005 | Marchisio et al. ................ 707/3 |

(Continued)

FOREIGN PATENT DOCUMENTS

| WO | 2006108069 A2 | 10/2006 |
| WO | 2008061290 A1 | 5/2008 |
| WO | 2010048538 A4 | 4/2010 |

OTHER PUBLICATIONS

Christen, Peter, "A Comparison of Personal Name Matching: Techniques and Practical Issues", Joint Computer Science Technical Report Series, Sep. 2006, TR-CS-06-02, The Australian National University, Canberra ACT 0200, Australia.

(Continued)

*Primary Examiner* — James Trujillo
*Assistant Examiner* — Hubert Cheung

(57) ABSTRACT

A search method is provided. The method comprises, building a first plurality of collectors, associating a first plurality of index entries with the first plurality of collectors, wherein each index entry comprises a search target and is associated with at least one of the first plurality of collectors based on a similarity between the search target of the index entry and the at least one collector, selecting a second plurality of collectors from among the first collectors based on a similarity between a search term and each of the second plurality of collectors, selecting a second plurality of index entries from among the index entries associated with the second plurality of collectors based on a similarity between the search term and the search target of each of the index entries associated with the second plurality of collectors, and presenting information related to the second plurality of index entries.

19 Claims, 11 Drawing Sheets

(56) References Cited

U.S. PATENT DOCUMENTS

| | | | |
|---|---|---|---|
| 2006/0242180 A1* | 10/2006 | Graf et al. | 707/101 |
| 2007/0251998 A1* | 11/2007 | Belenki | 235/380 |
| 2008/0059408 A1* | 3/2008 | Barsness et al. | 707/2 |
| 2008/0104062 A1 | 5/2008 | Oliver et al. | |
| 2008/0134209 A1 | 6/2008 | Bansal et al. | |
| 2008/0189279 A1 | 8/2008 | Mayer et al. | |
| 2009/0006394 A1 | 1/2009 | Snapp et al. | |
| 2009/0024584 A1* | 1/2009 | Dharap et al. | 707/3 |
| 2009/0210418 A1* | 8/2009 | Arasu et al. | 707/6 |
| 2010/0023515 A1 | 1/2010 | Marx | |
| 2010/0057370 A1 | 3/2010 | Shibuya | |
| 2010/0076972 A1 | 3/2010 | Baron et al. | |
| 2010/0121850 A1 | 5/2010 | Moitra et al. | |
| 2010/0125594 A1* | 5/2010 | Li et al. | 707/758 |
| 2010/0185496 A1 | 7/2010 | Hahn et al. | |
| 2010/0198851 A1 | 8/2010 | Bellamy et al. | |
| 2011/0022596 A1* | 1/2011 | Wei et al. | 707/737 |
| 2011/0179016 A1* | 7/2011 | Narula et al. | 707/721 |
| 2013/0238584 A1* | 9/2013 | Hendry | 707/706 |

OTHER PUBLICATIONS

Koudas, Nick et al., "Flexible String Matching Against Large Databases in Practice", Proceedings of the 30th VLDB Conference, Toronto, Canada, 2004.

* cited by examiner

SYSTEM AND METHOD OF PARTITIONED LEXICOGRAPHIC SEARCH

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data may be stored in data stores and/or data bases that provide access to the data via application programming interfaces to other applications that use the data in various ways. Banks and/or financial services companies may store account information in data stores. Telecommunications service providers may store account information and/or information about subscribers in data stores. Data stores and/or data bases may be an abstraction that is supported by underlying software that executes on one or more servers. Data in the data store and/or data bases may be accessed based on one or more keys. Typically, to access a particular item of data in a data store, for example to access an entry for a financial account, a key that exactly matches the key of the subject entry needs to be provided.

SUMMARY

In an embodiment, a computer automated search method is disclosed. The method comprises an application executing on a computer building a first plurality of collectors and an application executing on a computer associating a first plurality of index entries with the first plurality of collectors, wherein each index entry comprises a search target wherein each index entry is associated with at least one of the first plurality of collectors based on a similarity between the search target of the index entry and the at least one collector. The method further comprises an application executing on a computer selecting a second plurality of collectors from among the first collectors based on a similarity between a search term and each of the second plurality of collectors and an application executing on a computer selecting a second plurality of index entries from among the index entries associated with the second plurality of collectors based on a similarity between the search term and the search target of each of the index entries associated with the second plurality of collectors. The method further comprises presenting information related to the second plurality of index entries.

In an embodiment, a computer automated search method is disclosed. The method comprises an application executing on a computer building a first plurality of collectors and an application executing on a computer associating a first plurality of index entries with the first plurality of collectors to create an index, wherein each index entry comprises a search target, wherein each one of the first plurality of index entries is associated with at least one of the first plurality of collectors based on a similarity between the search target of the index entry and the at least one collector. The method further comprises, in response to one of adding at least one index entry to the index or deleting at least one index entry from the index to create a second plurality of index entries, an application executing on a computer building a second plurality of collectors using the genetic algorithm, wherein the second plurality of collectors is based on the first plurality of collectors. The method further comprises an application executing on a computer associating the second plurality of index entries with the second plurality of collectors, wherein each one of the second plurality of index entries is associated with at least one of the second plurality of collectors based on a similarity between the search target of the index entry and the at least one collector and an application executing on a computer selecting a third plurality of collectors from among the second plurality of collectors based on a similarity between a search term and the third plurality of collectors. The method further comprises an application executing on a computer selecting a third plurality of index entries from among the second plurality of index entries associated with the third plurality of collectors based on a similarity between the search term and the search target of each of the third plurality of index entries and presenting information related to the third plurality of index entries.

In an embodiment, a computer automated method for determining a similarity between two symbol strings is disclosed. The method comprises an application executing on a computer receiving a first symbol string. The method further comprises creating a data structure that has a first group of elements, wherein the number of elements in the first group of elements is equal to the number of different symbol values in a symbol set that the first symbol string is composed from, and wherein each element of the first group of elements corresponds to one of the symbol values and indicates the location of the corresponding symbol value in the first symbol string. The method further comprises receiving a second symbol string, wherein the second symbol string is composed from the symbols that comprise the symbol set and determining a similarity between the second symbol string and the first symbol string based on using each of the symbols of the second symbol string to index into the corresponding element of the first group of elements in the data structure to determine whether the subject symbol in the second symbol string is present in the first symbol string. The method further comprises automatically taking an action based on the similarity between the second symbol string and the first symbol string.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
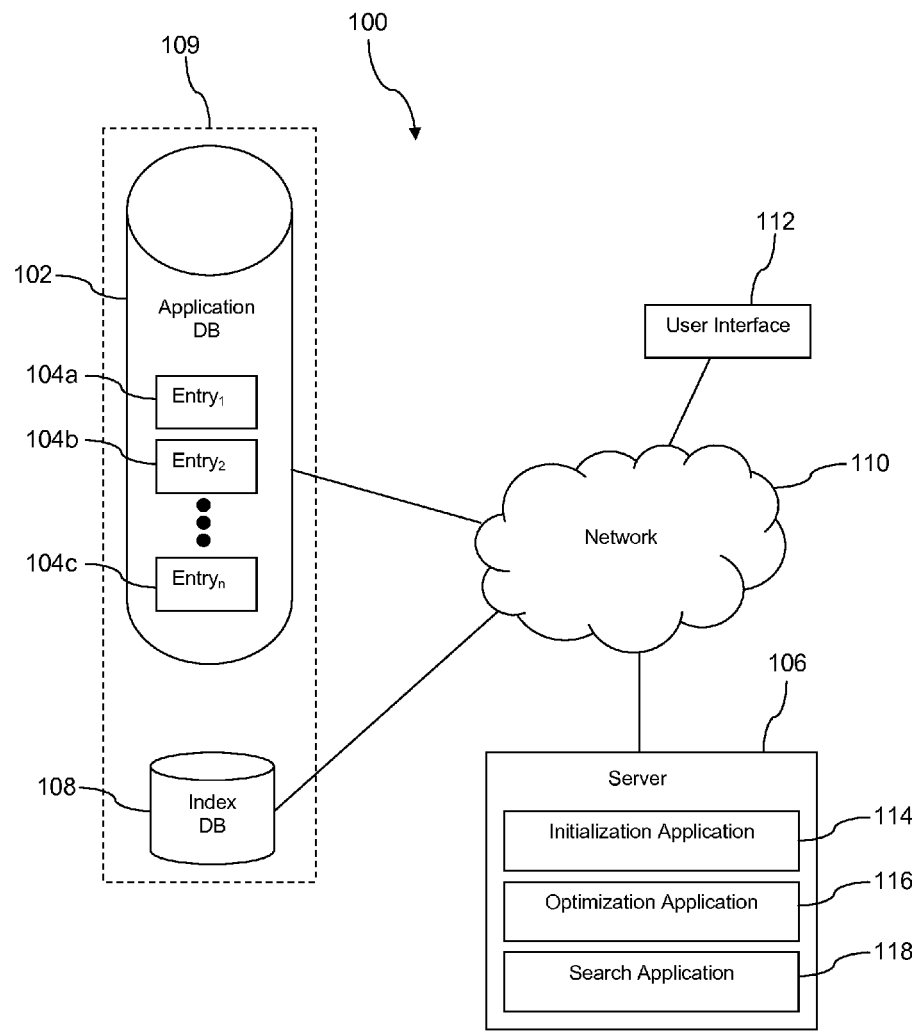
FIG. 1 is a block diagram of a partitioned lexicographic similarity-based search system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method for conducting partitioned lexicographic searches is described. These searches may be conducted based on one or more similarity metrics and may be referred to in some contexts as partitioned lexicographic similarity-based searches. As used herein, a similarity-based search is meant to refer to a search that is conducted to find a plurality of near or approximate matches of entries in a data store to a search term. Such near or approximate matches to the search term are, in a sense, similar to the search term. For example, a lexicographic similarity-based search of a data store using 'robed brown' as the search term may return a plurality of entries from the data store, including entries having a name field of 'robed brown', 'roberta brown', 'robed braun', 'robert towne', 'roger brown', and others. As another example, a lexicographic similarity-based search using 'robrt brown' as the search term may likewise return a plurality of entries from the data store including entries having a name field of 'robert brown', 'roberta brown', 'robert braun', 'robert towne', 'roger brown', and others. It is understood that the entries in the data store may have a number of fields in addition to the name field, for example an address field, an account number field, a driver license number field, a social security number field, and other fields.

A lexicographic search is a search that is seeking to find a relatively small symbol string, for example a name like "robert brown" or an address such as "12345 street, anytown, us, 54321." In an embodiment, a lexicographic search may be limited to seeking a symbol string comprised of less than 1000 symbols. A lexicographic search is distinct from a document search, which may seek an entire document based on some search criteria, for example based on word frequencies. The term lexicographic search as used herein may be said to involve searching structured data. For example, a name, an address, or a social security number are structured pieces of data with specific meaning as a field or collection of fields. By contrast, document searches may be said to involve searching unstructured data, for example searching a lot of text with no readily characterized structure.

Without limiting the applicability of the partitioned lexicographic search disclosed herein, a lexicographic similarity-based search may be able to find wanted entries or records in a data store based on an input search term that is not an exact match to one of the keys of the entry in the data store. The set of near matches to the search term may be identified by determining a similarity metric that quantifies a similarity between the search term and one or more fields in the entries in the data store, and selecting those near matches that are most nearly similar to the search term, as quantified by the similarity metrics. In an embodiment, the similarity metric may be calculated using an edit distance algorithm, for example a Jaro edit distance algorithm or a modified Jaro edit distance algorithm. It is understood that the concept of near match includes an exact match. Thus, both 'roberta' and 'robert' may be deemed near matches to the search term 'robert.'

Data stores that are used in some practical business environments may comprise up to about 1 million entries, up to about 5 million entries, up to about 10 million entries, or more entries. Calculating a similarity metric between a search term and a field in every entry in a data store may become intractable as the number of the entries in the data store grows large: the search may take too long to complete and/or may consume more processing resources than desirable. The present disclosure teaches intelligently pruning or selecting the portions of the database that are searched, thereby limiting the processing load of conducting the lexicographic similarity-based search in a large data store environment. This is accomplished by creating an index data store comprising index entries that may reference or identify the corresponding entries in the data store. A plurality of partitions are defined, and each of the index entries is distributed to one of the partitions based on a similarity metric that is calculated between a search target of the index entry and a collector associated with each of the partitions. Each index entry is associated with or distributed to the partition associated with the collector to which the search target of the index entry is most similar, as quantified by the similarity metric. In some contexts the collector may be known or referred to as a token or an attractor. The collector comprises and/or embeds a symbol string. In an embodiment, the search target comprises a symbol string, for example a string of letters "robert brown," that promotes searching for the index entry.

When a lexicographic similarity-based search is initiated, a similarity metric is calculated between the search term and each of the collectors, and a relatively small number of the partitions whose collectors are most similar to the search term are selected for searching based on the similarity metric values, thereby intelligently pruning or limiting the search space. For each of the selected partitions, a similarity metric is calculated between the search term and the search target of each of the index entries associated with the selected partition. Those index entries whose search targets are most similar to the search term, as quantified by the similarity metrics, may be deemed a near match to the search term and to comprise in aggregation the lexicographic similarity-based search results.

In an embodiment, the index entries of the lexicographic similarity-based search results are displayed on a user interface, perhaps to provide functionality for a user to select from among these lexicographic similarity-based search results. Alternatively, in an embodiment, entries in the data store corresponding to the index entries of the lexicographic similarity-based search results are accessed and several fields of these entries in the data store may be presented on a user interface. Alternatively, the information that is sought is stored directly in the index entries. In testing of prototypes, the disclosed partitioned lexicographic similarity-based search methods have been effective for finding sought after symbol strings based on search terms created by moderately mangling and strongly mangling the sought after symbol string.

As an example, an index data store of 1 million index entries may be distributed to about 1 thousand partitions, where about 1 thousand index entries are associated with each partition. Each of the index entries are distributed to or associated with one of the partitions based on determining a similarity between the search target of the index entry and each of the collectors and then distributing the index entry to the collector, and hence the associated partition, that is most similar to the search target of the index entry. As will be discussed further hereinafter, in an embodiment the process of building the partitions and/or defining the collectors may be performed using a genetic algorithm where the collectors are mutated, the resultant partitions are evaluated according to a fitness metric, and the results of the fitness metric evaluation may drive further evolution cycles.

After the partitions have been built, the index comprising the partitioned index entries may be searched using a search term. A similarity metric is calculated to quantify the similarity of the search term with each of the collectors associated with the 1 thousand partitions, and the 10 collectors that are determined to be most similar to the search term may be selected. In other circumstances, a different number of collectors may be selected. Selecting the 10 collectors entails calculating 1 thousand values of the similarity metric. The similarity metric is then calculated to quantify the similarity of the search term with the search target of each of the index entries associated with the 10 partitions identified by the selected 10 collectors is calculated. 20 of the index entries associated with the highest values of the similarity metric may be deemed the lexicographic similarity-based search results. Identifying the 20 index entries from among the selected 10 partitions entails calculating 10 thousand values of the second similarity metric. In other circumstances, a different number of index entries from among the selected 10 partitions may be identified and/or selected. Together, 11 thousand similarity metrics are calculated in this example, which is much more tractable than calculating 1 million similarity metrics that otherwise may have been performed if partitioning were not employed. The approach described in brief above may be said to intelligently prune away 990 of the 1000 partitions, thereby saving much execution time.

The description above has related to a single index, for example a name index. In some embodiments, however, the index data store may be built to support searching using any one of a plurality of different indices. For example, the index data store may comprise a first index comprising index entries having a name search term distributed to a first plurality of partitions, a second index comprising index entries having an address search term distributed to a second plurality of partitions, a third index comprising index entries having an account number search term distributed to a third plurality of partitions, and possibly other indices comprising index entries having different types of search terms. An index data store comprising a plurality of different kinds of indices may promote searching based on any of a name alone, an address alone, an account number alone, or other individual types of search terms.

The index entries from different indices that are associated with the same specific entry in the data store may each contain a reference that references the same specific entry in the data store. For example, if the data store comprises an entry "18357:robert brown:12345 Street:6789"; a first index may have an index entry having a name search target value of "robed brown" and a reference "18357"; a second index may have an index entry having an address search target value of "12345 Street" and the reference "18357"; and a third index may have an index entry having an account search target value of "6789" and the reference "18357." The first index may be associated with a first plurality of partitions; the second index may be associated with a second plurality of partitions; and the third index may be associated with a third plurality of partitions. Thus, any of the types of search target may be used to find the entry in the data store. In an embodiment, the system may support searching based on two search terms at the same time, as will be discussed in more detail hereinafter. The index entry may not contain a reference to the data store and instead may contain within itself the information that is sought by the lexicographic similarity-based searches.

Turning now to FIG. 1, a partitioned lexicographic similarity-based search system 100 is described. In an embodiment, the system 100 comprises an application data store 102 having a plurality of entries 104, a server computer 106, an index data store 108, a network 110, and a user interface 112. In some contexts, the application data store 102 may be referred to simply as the data store. The application data store 102 may store data associated with an application independent of the applications 114, 116, 118, for example a bank account management application, a telecommunications service provider subscriber account management application, or other application. The server computer 106 may execute a plurality of applications including an initialization application 114, an optimization application 116, and a search application 118. In an embodiment, the application data store 102 and the index data store 108 may be located within the same large data store 109 and/or database management system (DBMS).

Those skilled in the art will readily appreciate that the functionality of the system 100 may be implemented in other forms and/or by other variant configurations, all of which are contemplated by the present disclosure. For example, the index data store 108 may be outside of the large data store 109 and instead independently coupled to the network 110 and/or to the server computer 106. The index data store 108 may be maintained in random access memory (RAM) of the server computer 106. The server computer 106 may be a desktop computer, and the user interface may be provided by the desktop computer. Two or more of the applications 114, 116, 118 may be integrated into a single application or one of the applications 114, 116, 118 may be implemented as two or more separate applications and/or components. The server computer 106 may comprise a plurality of computers. One or more of the applications 114, 116, 118 may execute in the large data store 109, for example in a stored procedure executing in a database management system. In an embodiment, the system 100 may not comprise the application data store 102, for example when the sought for information is stored directly in the index entries. Yet other variations are consistent with the spirit and teachings of the present disclosure.

The network 110 may be any combination of public and private communication networks. Some of the coupling between the application data store 102, the server computer 106, and the user interface 112 may be provided over virtual private network (VPN) channels. The server computer 106 may be any computer or computer system, for example comprising a plurality of computers that collectively share a processing load associated with the applications 114, 116, 118. Computer systems are described in more detail hereinafter. The application data store 102 may be provided by a database management system (DBMS). The application data store 102 may be provided by a computer system coupled to secondary storage devices. The user interface 112 may be a desktop computer, a workstation, or other electronic device.

The index data store 108 comprises indices, wherein each of the indices is comprised of index entries having a type of a search target that is distinctive to the subject index. For example, a first index may comprise index entries having a name type of search target. In some contexts, indices may be named based on the type of search target of their index entries. For example, the first index may be referred to as the name index or the name string index. Depending on the index, the search target of the index entries may correspond to a name, an address, an account number, a driver license number, a social security number, or other information. The index entries may comprise an identifier of a collector and/or a partition to which the index entry is associated. The index entry may comprise a reference to one of the entries 104 in the application data store 102, for example the information that a lexicographic similarity-based search based on the search term may be intended to access. Alternatively, the index entry may comprise target information that itself contains the information sought by the lexicographic similarity-based searches. In an embodiment, each of the indices may further comprise a search target data structure that is discussed hereinafter.

The index entries of a given index in the index data store 108 are distributed to a plurality of partitions based on a similarity between the search target of each index entry to the collector associated with a specific partition. The collector may contain multiple fields and/or components, and when it is said that the collector is similar to a given symbol string, this means that the given symbol string is similar to a symbol string encapsulated within the collector. For example, a first index entry is associated with a first collector, and hence with a first partition associated with the first collector, because a similarity metric calculated based on the search target of the first index entry and the first collector indicates a higher degree of similarity than the similarity metrics calculated based on the search target of the first index entry and every other one of the collectors.

Collectors have a one-to-one relationship to partitions. For example, each partition is associated with a unique collector, and each collector is associated with a unique partition. Due to this identity between collectors and partitions, to some extent these terms may be used interchangeably herein. For example, an index entry may be said to be distributed to a collector or distributed to a partition. As another example, an index entry may be said to be associated with a collector or associated with a partition.

Figure 2:
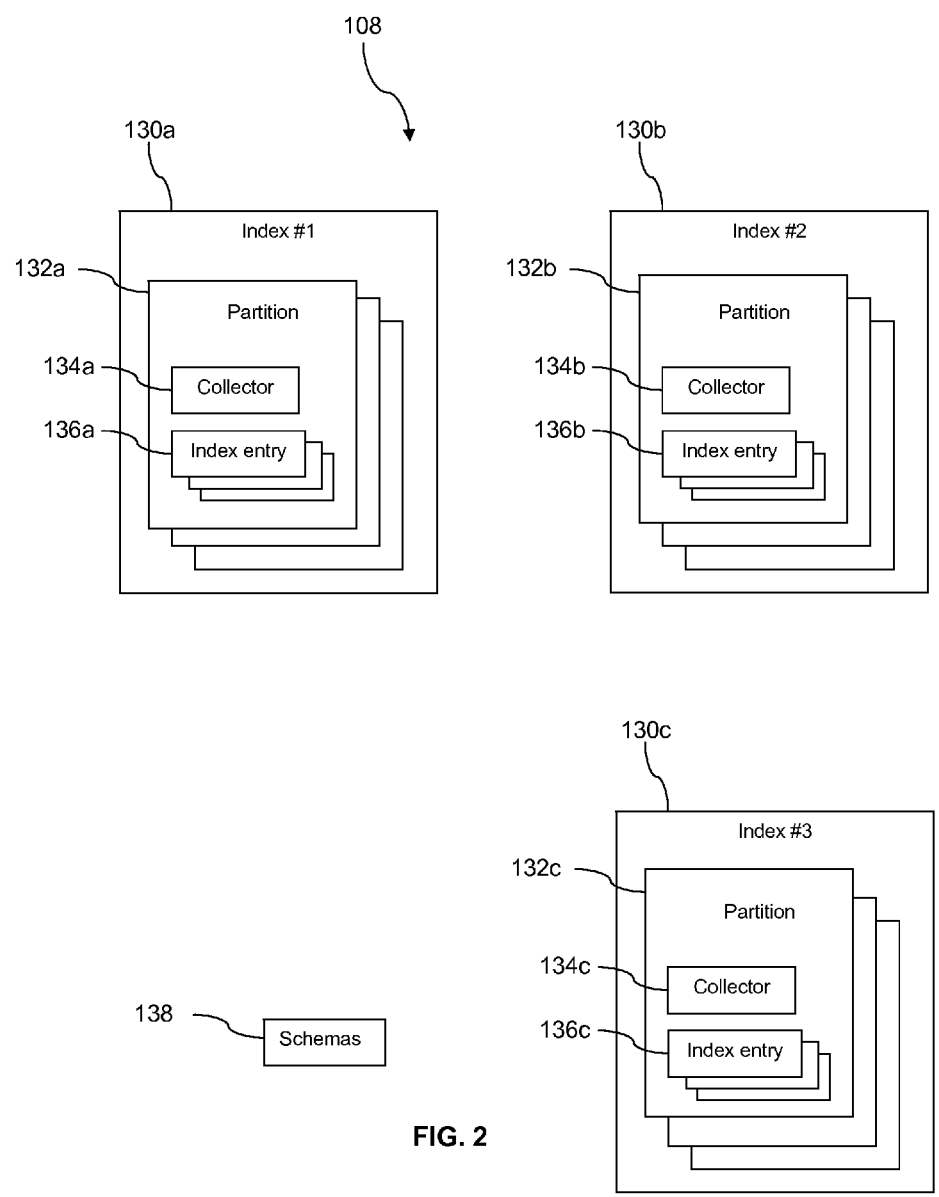
FIG. 2 is a block diagram of an index data store according to an embodiment of the disclosure.

Turning now to FIG. 2, aspects of an embodiment of the index data store 108 are described. The index data store 108 may be said to comprise a plurality of indices 130, for example a name index 130a that may also be referred to as a first index 130a, an address index 130b that may also be referred to as a second index 130b, an account number index 130c that may also be referred to as a third index 130c, and possibly other indices. Each index 130 may comprise a large number of index entries 136, for example more than 10,000 index entries. Each of the index entries 136 may comprise a data store entry reference that identifies a database entry 104. Alternatively, the index entries 136 may comprise a target information component, element, or field that contains the information that is sought by the lexicographic similarity-based searches. Each index entry 136 comprises a search target corresponding to the type of index 130. The search target may be a symbol string, for example "robert brown." Each of the indices 130 further comprises a plurality of partitions 132 to which the index entries 136 are distributed. Each of the partitions 132 of the subject index 130 is associated with a collector 134. In some contexts the collector 134 may be referred to or known as a token or an attractor. The index entries 136 may further comprise a collector identity, for example a collector identity attribute or field, that identifies the collector 134 (and hence the partition 132) that the subject index entry 136 is associated with. In another embodiment, however, the index data store 108 may be structured otherwise.

It is understood that a partition 132 may be simply an abstraction for understanding how the index data store 108 works: partitions 132 may have no existence separate from the collectors 134 that they are said to be associated with. Alternatively, a partition 132 may be a data structure or a data table that comprises various information including the collector 134 and/or information about the distribution of index entries 136 to the subject partition 132. A partition 132 may be considered to comprise a plurality of index entries 136 that are associated with the same collector 134, for example, these index entries 136 may have a collector identity field that is the same. Some of the discussion below will focus on a single index 130, but the description substantially applies to the other indices 130 as well. Where there are differences between different indices 130, these differences will be pointed out and described.

The index data store 108 may be initialized by the initialization application 114 and/or the optimization application 116. In an embodiment, when initializing the index data store 108, each of the indices 130 is built based on accessing each of the entries 104 in the application data store 102. An index entry 136 may be created for each entry 104 for each index 130. Thus, if there are two search fields, a first index 130a and a second index 130b, two index entries 136 are created, a first index entry 136a and a second index entry 136b, each having a reference that identifies the first entry 104a, for example a key used by the application data store 102 to uniquely identify the first entry 104a. The search target of the first index entry 136a corresponding to the first index 130a will be assigned a value based on information contained in the first entry 104a associated with the first index 130a.

For example, if the first index 130a is a name index 130a, then the search target of the first index entry 136a corresponding to the first index 130a will be assigned a name contained in the first entry 104a, for example "robed brown." The search target of the second index entry 136b corresponding to the second index 130b will be assigned a value based on information contained in the first entry 104a associated with the second index 130b. For example, if the second index 130b is an address index 130b, then the search target of the second index entry 136b corresponding to the second index 130b will be assigned an address contained in the first entry 104a, for example "12345 street." To generalize, in an embodiment the search targets comprise strings of symbols from a pre-defined symbol set. These pre-defined symbol sets may comprise one or more of an alphabet, a set of numerals, and other sets of symbols. The pre-defined symbol set may comprise the symbol set defined by the American Standard Code for Information Interchange (ASCII) or the symbol set defined by the extended ASCII. The pre-defined symbol set may comprise an expressly enumerated and bounded set of values.

When the index entries 136 do not have a data store reference identifying entries 104 in the application data store 102, the indices 130 are initialized somewhat differently. For example, the initialization application 114, may read a data file or obtain the information from another source and may automatically generate the index entries 136 with target information component storing the sought for information in the index entries 136 themselves. In this case, a plurality of indices 130 may likewise be created, and in this case a plurality of index entries 136—one index entry 136 per index 130—may be initialized with the same information that is sought by the searches.

Additionally, when initializing the index data store 108, a plurality of collectors 134 associated with each of the indices 130 is built. In an embodiment, a number of collectors 134 to be built is determined based on the number of entries 104 in the application data store 102 and/or based on the number of index entries 136. The collectors 134 may be formed of the same symbols, such as characters and numerals, that are used to assign the search targets. In an embodiment, however, the symbols may be other than characters and numerals. Thus, for names, characters excluding numerals may be assigned as search targets. For addresses, both characters and numerals may be assigned as search targets of the index entries 136. The collectors 134 associated with an index 130 may each be formed of the same number of symbols. In an embodiment, the collectors 134 may be formed of a greater number of symbols than the longest search target of the index entries 136 in the subject index 130. Alternatively, the collectors 134 may be formed of a number of symbols that is longer than some threshold percentage of the search targets of the index entries 136. Alternatively, the collectors 134 may be formed of a number of symbols that is fewer than the number of symbols in the subject symbol set. Alternatively, the collectors 134 may be formed of some other number of symbols.

Figure 3:
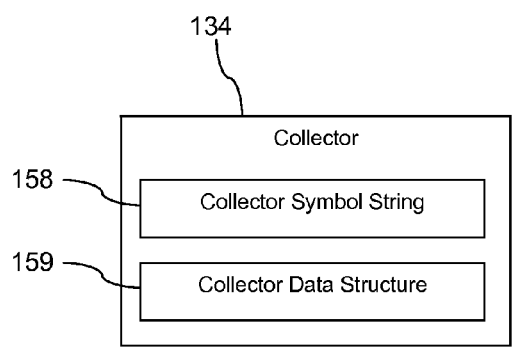
FIG. 3 is a block diagram of a collector in an index according to an embodiment of the disclosure.

Turning now to FIG. 3, an embodiment of a collector 134 is described. In an embodiment, the collector 134 comprises a collector symbol string 158 that comprises a string of symbols, for example a string of symbols from a symbol set such as an alphabet or other symbol set. In an embodiment, the collector 134 may further comprise a collector data structure 159 that represents the collector symbol string 158 in a form that promotes improved performance of an algorithm for determining a similarity metric. The collector data structure 159 is described further below with reference to FIG. 6. The collector 134 may further comprise additional components, elements, or fields related to maintaining counts of index entries 136 associated with the subject collector 134 and statistics of similarity metric calculations performed when associating index entries 136 to collectors 134. In some embodiments, the collector 134 may be replaced by a partition data structure that comprises the collector symbol string 158 and the optional collector data structure 159. In another embodiment, however, the collector 134 may have different structures and/or components.

Figure 4:
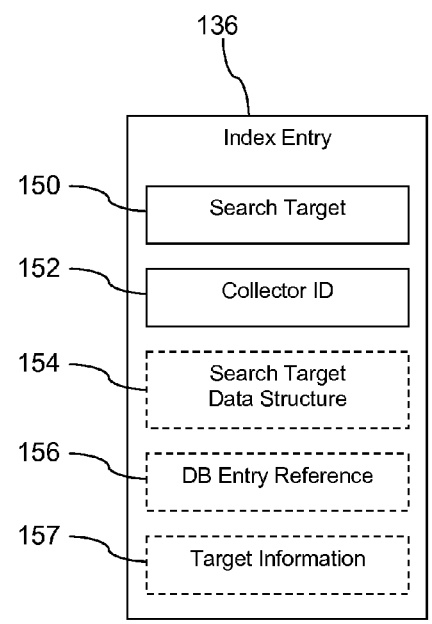
FIG. 4 is a block diagram of an index entry in an index according to an embodiment of the disclosure.

Turning now to FIG. 4, an embodiment of an index entry 136 is described. The index entry 136 may comprise a search target 150, a collector identity 152, and a data store entry reference 156 that identifies an entry 104 in the application data store 102. In some contexts the data store entry reference 156 may be referred to as an application key. In an embodiment, the index entry 136 may comprise additional data elements, for example a search target data structure 154 that represents the search target 150 in a form that promotes improved performance of an algorithm for determining a similarity metric. The search target data structure 154 will be described in more detail further below with reference to FIG. 6. In an embodiment, the index entry 136 may not comprise the data store entry reference 156 and instead may comprise a target information component 157, attribute, or field that contains the data or information that is sought by the lexicographic similarity-based searches. In another embodiment, however, the index entry 136 may have different structures and/or components.

The collectors 134 may be generated in any way that conforms to the constraints described above. Further, the collectors 134 or collector symbol string 158 may be generated in such a way that there are no duplicate collectors. In an embodiment, the initial set of collectors 134 associated with the index 130 may be generated randomly from the set of symbols allowable for the subject index 130. For example, if the collectors 134 comprise a sequence of 40 symbols selected from a symbol set comprising 36 different symbols, a random number generator may execute to produce a first random number, this random number may be used to select the first symbol of the collector 134 from the symbol set; next the random number generator may execute to produce a second random number, this random number may be used to select the second symbol of the collector 134 from the symbol set; and so on to select the remaining symbols of the collector 134 from the symbol set. In another embodiment, a given number of index entries 136 may be selected randomly, and collectors 134 may be defined based on these index entries 136, for example by padding and/or mutating the symbol strings contained by the index entries 136. A check can be run at some point to exclude duplicate collectors. The set of letters of the alphabet, ignoring case, and the numerals 0 through 9 would comprise a symbol set of 36 symbols.

In an embodiment, creating the collector 134 comprises assigning a symbol string value to the collector symbol string 158. In an embodiment, creating the collector 134 further comprises analyzing the symbol string value to build and assign values to the collector data structure 159. As will be discussed further below, the collectors 134 associated with the subject index 130 may be compared to a fitness metric and, based on the fitness of the collectors 134 and/or the partitions 132 associated with the collectors 134, the collectors 134 may be evolved by discarding some collectors 134 and mutating other collectors 134 to create new collectors 134 related to their parent collectors 134 while the collectors that were mutated to create the new collectors 134 may be retained in the partitions 132. This may be referred to as creating a set of collectors 134 and/or 132 partitions based on a genetic algorithm.

It is understood that the present disclosure teaches creating collectors 134, search targets 150, and other symbol strings (such as search terms discussed below) based on other symbol sets, for example based on character sets other than the English character set such as French characters (e.g., ç, é, ô, are not part of the English character set), Cyrillic characters, Arabic characters, Hebrew characters, Hangul characters, Kanji characters, Chinese characters, and other character sets. It is contemplated that expanded character sets may be employed as a symbol set, for example a set of both upper case and lower case letters. It is contemplated that the American Standard Code for Information Interchange (ASCII) symbol set and or the extended ASCII symbol set may be employed. In an embodiment, the symbol set may be defined by a Unicode character set, where the Unicode characters are mapped to other symbols, for example characters other than those included in the English language character set. Further, it is contemplated that other symbol sets may be employed that are not related to language character sets, such as symbols employed in creating universal product codes (UPCs), bar codes, and two dimensional bar codes. Likewise, it is contemplated that other symbol sets related to magnetic strip values and electrical values such as quadrature amplitude modulation (QAM) symbols, 16-QAM symbols, 64-QAM symbols, etc., may be employed.

The index entries 136 associated with the index 130 are then distributed to each of the collectors 134 and/or to the partitions 132. For each of the collectors 134, a similarity metric is calculated between the search target 150 of the index entry 136 and the collector 134. Then the index entry 136 is distributed and/or associated to the collector 134 having the highest similarity with the search target 150 of the index entry 136, based on the calculated similarity metrics. Distributing or associating an index entry 136 to a collector 134 may entail writing the symbol string encapsulated in the collector 134, for example in the collector symbol string 158, into the collector identity 152 of the index entry 136. Alternatively, or in addition, distributing or associating an index entry 136 to the collector 134 may entail writing a collector key value encapsulated in the collector 134 into the collector identity 152 or another field of the index entry 136. The collector key value may comprise a number, for example an eight byte number, that may be used as a look-up or reference to access the subject collector 134. Each of the index entries 136 may be distributed to a set of collectors 134 in this manner. It is understood that associating an index entry 136 to a collector 134 may be referred to in some contexts as associating, allocating, or assigning the index entry 136 to the partition 132 associated with the collector 134. This process of associating index entries 136 with collectors 134 can be repeated for each of the indices 130 in a similar fashion.

In an embodiment, an edit distance algorithm may be employed to determine the similarity metric. An edit distance algorithm generally calculates a similarity metric value that represents the distance between a first thing and a second thing, for example between a first symbol string and a second symbol string. For example, the edit distance between the symbol strings "robert brown" and "roberta brown" would be expected to be relatively small while the edit distance between the symbol strings "robert brown" and "john smith" would be expected to be relatively large. In some cases the edit distance algorithm may calculate a value in the range for 0 to 1, where the value 1 corresponds to an exact match between the things compared and the value 0 corresponds to zero similarity between the things compared. The similarity between "robert brown" and "roberta brown" would be expected to be relatively close to but less than the value 1, while the similarity between "robert brown" and "john smith" would be much closer to the value 0, though not 0 because at least some symbols are shared between the two disparate symbol strings, for example 'o', 'n', and T. In other embodiments, the range of values calculated by the similarity metric and/or edit distance algorithm may be different.

In an embodiment, a Jaro edit distance algorithm may be employed to determine the similarity metric value, for example when the search target 150 and the collectors 134 comprise symbols that are characters, numerals, and/or other symbols. In an embodiment, an enhanced Jaro edit distance algorithm may be employed to determine the similarity metric. Jaro edit distance algorithms and an enhanced Jaro edit distance algorithm will be discussed in more detail below. In other embodiments, however, other edit distance algorithms and/or other similarity metric calculation algorithms may be employed. It is understood that in some embodiments, the similarity metric calculation may be based on the semantics of the information contained in the search targets 150.

It may happen that the first random selection of collectors 134 for partitioning the index entries 136 of an index 130 and/or distributing the index entries 136 to collectors 134 of an index 130 may result in an undesirable distribution of the index entries 136. The relative quality of the distribution of the index entries 136 to partitions 132 and/or to collectors 134 may be quantified by calculating a fitness metric of the distribution of index entries 136 and/or a fitness metric of the partitions 132. It is understood that a variety of fitness metrics and/or fitness algorithms may be suitable for use with the system 100. In an embodiment, the fitness metric may be calculated based on the numbers of index entries 136 distributed to each partition 132 and/or collector 134. Generally, it may be preferred that the numbers of index entries 136 distributed to each partition 132 and/or collector 134 be approximately equal for each of the partitions 132 and/or collectors 134.

For example, if there are about one thousand partitions 132 and about one million index entries 136, it may be preferred that each partition 132 have about one thousand index entries 136 associated with it. On the other hand, a selection of collectors 134 that promotes a distribution that results in one hundred of the partitions 132 having zero index entries 136 associated with them and forty partitions 132 each having twenty thousand index entries 136 associated with them may be deemed relatively unfit. In this case, searching two of the partitions 132 from among the forty partitions 132 would involve forty thousand calculations of the similarity metric, many more calculations than would be involved in searching ten of the partitions 132 that had about one thousand index entries 136 distributed to each of them.

When the fitness metric determined for the distribution does not satisfy a fitness criterion, the collectors 134 may be determined again, the index entries 136 distributed again, and the fitness metric determined for the new distribution. Each set of collectors 134 and partitions 132 and the distribution of index entries 136 to the collectors 134 and/or the partitions 132 may be referred to as a generation and the process of creating new generations of collectors 134 and/or partitions 132 may be referred to as evolution and/or evolving the collectors 134 and/or the partitions 132. Some of the collectors 134 may be retained from a first generation to a second generation, some collectors 134 present in the first generation may be deleted from the second generation, and some collectors 134 present in the first generation may be split into two or more collectors 134 in the second generation. Alternatively, this process of creating new generations of collectors 134 and/or partitions 132 and distributing the index entries 136 to the collectors 134 and/or the partitions 132 may be referred to as optimization and/or optimizing the index 130. This process may continue until the determined collectors 134 result in a distribution that satisfies the fitness metric criterion. It is observed that as the index 130 changes—as new index entries 136 are added and as some index entries 136 are deleted, the fitness of some of the collectors 134 and/or partitions 132 may decline, and ultimately a new cycle of evolution or optimization may be triggered to improve the fitness of the collectors 134, the partitions 132, and/or the distribution of index entries to collectors 134 and/or partitions 132.

At an abstract level, this approach may be characterized as a genetic algorithm. In some tests of system 100, this genetic algorithm has been found to produce an effective distribution of index entries 136 to collectors 134 and/or partitions 132 in as few as four cycles and/or iterations. Without limitation, a genetic algorithm may be said to consist in computing a fitness metric on a population of entities, in the present case the collectors 134, and mutating at least some members of the population of entities based on the fitness metric to evolve the population of entities toward a more optimal state as quantified by the fitness metric. The present disclosure contemplates a variety of implementations of genetic algorithms for evolving the collectors 134 over time, as new index entries 136 are added to the index 130 and as other index entries 136 are deleted from the index 130. In an embodiment, the mutation and evolution of the collectors 134 and/or the partitions 132 may be performed in part by the optimization application 116.

In an embodiment, collectors 134 that are associated with zero or a relatively small number of index entries 136 may be deemed unfit and may be deleted from the set of collectors 134. Collectors 134 that are associated with a relatively high number of index entries 136 may be deemed unfit and may be replaced by two new collectors, three new collectors, or greater than three new collectors, depending on how much the number of index entries 136 associated with the subject collector 134 exceeds a partition 132 fitness criterion and/or a collector 134 fitness criterion. In an embodiment, the original collector 134 having a relatively high number of index entries 136 associated with it may be retained, which may be referred to as the parent collector 134, and one or more new collectors 134 may be created by mutating the parent collector 134. A reproduction rate may be configured that identifies how many new collectors 134 to create based on the relative fitness of the subject collector 134. A mutation rate may be configured that identifies how many symbols of the collectors 134 are changed during a mutation, for example a mutation rate of 0.2 may mean that about 1 out of 5 symbols of the collector 134 are mutated. The mutation rate may be statically configured. Alternatively, the mutation rate may be adaptively determined based on a phase of evolution. For example, a first mutation rate may be employed during initialization of the index 130; a second mutation rate may be employed after the collectors 134 have evolved to a given level of fitness, for example as minor adjustments are made to accommodate minor imbalances in the distribution of index entries 136 to collectors 134 and/or partitions 132 over time with addition and loss of index entries 136.

The present disclosure contemplates a variety of different mutation algorithms. In general, the approach is to either replace or supplement a collector 134 that attracts too many index entries 136 by creating a close neighbor of the strong collector 134. This may be done in a variety of ways, often involving retaining at least some of the symbols of the original collector 134. At a high level, the role of mutation is to introduce new previously unknown entities—collectors 134—into the population. If the mutation is good, the mutation will survive; if the mutation is bad, the mutation will die. Some mutation algorithms may be substantially random and may produce as many poor mutations as good mutations. Other mutation algorithms may attempt to bias the fitness of mutations to have more fit mutations than unfit mutations by doing some analysis of the index entries 136.

In an embodiment, the new collectors 134 are determined from the old collector 134 by randomly selecting a number of symbol positions of the old collector 134 for mutation. Then the selected symbol positions may be assigned a symbol value based on a randomizing algorithm, for example a random number generator generates a random number and this random number is used to select one of the members of the symbol set. For each new collector 134, this process may be repeated to build each new collector 134. The old collector 134 that has been mutated may be discarded or deleted from the index 130. Alternatively, the old collector 134 may be retained.

In another embodiment, a new collector 134 may be determined from the old collector 134 by selecting one or more symbols in the old collector that are determined to have been relatively unimportant in attracting the index entries 136 associated with the old collector 134 and forming a new collector 134 by replacing at least one of these relatively unimportant symbols with a symbol not present in the old collector 134 but present in either a relatively high number or in an average number of the index entries 136 associated with the old collector 134. To support these symbol frequency determinations a variety of counts may be accumulated during the course of distributing the index entries 136 to the collectors 134 and/or the partitions 132.

For example, at the time of assigning the collector identity 152 in the index entry 136, the similarity between the collector 134 and the search target 150 of the index entry 136 may be recalculated, and a first histogram may be constructed recording the number of times a symbol in the collector 134 matches a symbol in the search target 150. In an embodiment, the first histogram may tally a count only when the position of the symbol in the collector 134 and the matching symbol in the search target 150 are in relatively the same positions within their corresponding symbol strings. Thus, when a 'g' in the first third of the collector symbol string 158 matches a 'g' in the first third of the search target 150 of an index entry 136, a 'g' count of the first histogram is toggled; but when the 'g' in the search target 150 occurs in the second third or the last third of the search target 150, the 'g' count of the first histogram is not toggled.

When the index entries 136 have been distributed, then, the first histogram associated with every collector 134 would provide a record of the frequency of occurrences of symbols in the collector 134 in the index entries 136 associated with that collector 134. A second histogram could be built which records the frequency of occurrence of all symbols in the symbol set across the search targets 150 of the index entries 136 associated with that collector 134. It would be a relatively simple matter for one skilled in the art, provided with the teachings of the present disclosure, to perform the mutation described above once provided with the first and second histograms. The histograms may be implemented as an array of integers, each array element of the first histogram corresponding to a symbol in the first collector 134 and each array element of the second histogram corresponding to one of the symbols in the complete set of symbols. Alternatively, the histograms may be implemented in another form.

By retaining the old collector 134 and adding a new collector 134 that represents the described mutation of the old collector 134, it is hoped that the new collector 134 will attract some, but not all, of the index entries 136 originally associated with the old collector 134. By adjusting the selection of the replacement symbol from the second histogram—for example varying between frequent occurrence, to average occurrence, to rare occurrence in the search target 150 of the index entries 136—it may be possible to adjust the portion of index entries 136 that are attracted away from the old collector 134 and to the new collector 134. It is thought that the investment of extra processing time in building the first and second histograms may be recovered by an optimization that converges more rapidly on fit collectors 134 and/or partitions 132.

Note that the mutation based on the first and second histograms above takes only the frequency of symbols into consideration and ignores the positions of the symbols. In some edit distance algorithms, such as the standard Jaro edit distance algorithm, the calculation depends not only on symbol matches but also the relative positions of the matching symbols. In an embodiment, a third histogram may be constructed that is substantially similar to the second histogram, but adds position information. In an embodiment, the third histogram comprises a plurality of arrays where each element of the array corresponds to a count of occurrence of the corresponding symbol from the symbol set in the search targets 150 and each array is associated with a position in the search targets 150. In an embodiment, the positions in the search targets 150 may be categorized into a front position, a middle position, and an end position, and the third histogram comprises three arrays. This third histogram promotes selecting replacement symbols not only based on frequency of occurrence of the symbols in the search targets 150 but also based on the position of the symbols in the search targets 150. Thus, the symbol selected in the old collector 134 for replacement can be replaced with a symbol that is not in the old collector 134 and that has a relatively high or average frequency of occurrence in the search targets 150 of the index entries 136 in the corresponding position within the collector 134 and/or the collector symbol string 158.

In another embodiment, two collectors 134 that are deemed to be strong attractors, by virtue of an above average number of index entries 136 having been distributed to the two collectors 134, may be recombined to form one or more new collectors 134 that may attract away some index entries 136 from the two strong attractors. For example, a first new collector 134 is created as a copy of the first collector 134. Based on a mutation rate, a number of symbols in the first new collector 134 are selected, these selected symbols are replaced by the symbols in the corresponding positions of the second one of the collectors 134, and the first new collector 134 based on the recombination of the two strong collectors 134 is added to the set of collectors 134. A second new collector 134 may also be formed from recombining the two collectors 134 and added to the set of collectors 134. For example, the second new collector 134 is created by copying the second collector 134. Based on the mutation rate, a number of symbols in the second new collector 134 are selected, and these selected symbols are replaced by the symbols in the corresponding positions of the first collector 134. The selection of symbols in the original collectors 134 to be replaced may be selected at random. The number of symbols that are selected for replacement, in an embodiment, may be about half of the symbols in the subject collector 134. Yet other mutation algorithms and techniques are contemplated by the present disclosure for building new collectors 134 based on strong collectors 134.

After a new set of collectors 134 have been built comprising the new collectors 134 and the old collectors 134 that have not been discarded, the index entries 136 are again distributed to the collectors 134 and/or partitions 132 as described above. In an embodiment, all the index entries 136 are distributed to the collectors 134, including those index entries 136 formerly distributed to collectors 134 that were not deleted or mutated, because index entries 136 formerly associated with the undeleted collectors 134 may be more similar to one of the new collectors 134. If these index entries 136 were left associated with the undeleted collectors 134, the search application 118 may be less likely to locate them. When the collectors 134 satisfy the fitness metric or after a maximum number of mutation cycles, the initial distribution of index entries 136 to collectors 134 can be considered to be completed.

During initialization or during an optimization operation, intermediate collectors 134 and associations of index entries 136 to collectors 134 may not be changed in the index data store 108 but may instead be stored in a random access memory (RAM) or cache of the server computer system 106. When the set of collectors 134 is settled upon, then the information may be written into the data structures of the index 130 in the index data store 108. Alternatively, after the selection of the set of collectors 134 is settled upon or finalized, the index entries 136 may be distributed to the collectors 134 by again calculating the similarities between search targets 150 and collectors 134 or collector symbol strings 158. Writing into the data structures of the index 130 may comprise, for example, updating the collector identity 152 in some of the index entries 136 (those that have been distributed to a different collector 134). Writing into the data structures of the index 130 may comprise deleting some collectors 134 and/or partitions 132 and creating new collectors 134 and/or partitions 132. Writing into the data structures of the index 130 may comprise writing various counts and distribution metrics into the collectors 134 and/or into the partitions 132, for example a count of how many index entries 136 are associated with the subject partition 132 and statistical information about symbol matching between the search target 150 of the index entries 136 associated with the collector 134 and the collector symbol string 158 of the collector 134. Collectors 134 that are created may have a version identifier associated with them that remains unchanged during their continued existence and may be used to analyze the rate of change of the collectors 134 and/or the partitions 132. The version identifier may also be used during optimization to avoid losing search target 150 and/or index entries 136.

As new index entries 136 are added during in-service operation of the partitioned lexicographic similarity-based search system 100, they are distributed to the appropriate partition 132 and/or collector 134 as described above. As partitions 132 grow or decline, they may either be mutated into two new collectors 134 and/or partitions 132 or deleted, for example by performing optimization. The periodic or triggered evolution of the partitions 132 that occurs after completion of the initialization of the index 130 may be referred to in some contexts as optimization. It is understood that this process of initializing and evolving the index 130 happens to all of the indices 130 of the index data store 108. It should be noted that different indices may evolve independently. For example, the first index 130a may run triggered optimizations about every two weeks while the second index may run triggered optimizations about every 10 days.

It will be appreciated by one skilled in the art that the above described abstractions associated with the index data store 108 may be implemented in a variety of ways, and different implementations may be deemed suitable for different application contexts. For example, in an embodiment, each of the index entries 136 may be implemented as described with reference to FIG. 4 having the search target 150, the collector identity 152, and the data store entry reference 156. Alternatively, the index entry 136 may not comprise the collector identity 152, and a partition 132 may comprise a data structure that identifies each of the index entries 136 associated with it. For example, the partition 132 may comprise an array comprising elements that identify each of the index entries 136 associated with the collector 134 associated with that partition 132. Alternatively, rather than an array, the partition 132 may comprise a linked list of elements that identify each of the index entries 136 associated with it. The data structure that defines the partition 132 may also comprise the collector 134 associated with the partition 132. The collectors 134 of an index 130 may be stored in an array or in a linked list or in another data structure. Yet other implementations are contemplated by the present disclosure and are consistent with the partitioned lexicographic similarity-based search based on distributing index entries 136 to partitions 132 based on collectors 134.

When the index entries 136 have been distributed to the partitions 132—or in other words when each of the index entries 136 has been associated with a collector 134 which is most similar to the search target 150 of the index entry 136—the system 100 may be used to perform lexicographic similarity-based searches, for example, executing the search application 118 to find one or more entries 104 in the application data store 102 based on an input search term that need not be an exact match to a key of the corresponding entry 104 in the application data store 102. Alternatively, the search application 118 may be executed to find one or more target information components 157 based on the input search term that need not be an exact match to the search target 150 of the index entries 136.

The user interface 112 may request that a search term be entered into a text box associated with a particular index 130, for example one of a name search field, an address search field, an account number search field, or other search field. A user may enter a search term, for example the search term "robrt brown," into the user interface 112 in a name search field text box. Note that the input may be errored for some reason: it may be that the input should have been "robert brown." One skilled in the art will readily appreciate the many sources of error that can produce this kind of error. A clerk may have mistyped. A keyboard coupled to the user interface 112 may have a sticky key or have a hardware fault. The clerk may have misspelled a name (for example, misspelling "braun" as "brown"). The input to the user interface 112 may have been processed first by an automated voice recognition tool that made an error mapping from audio to the spelled name. Yet other error sources may account for this kind of error.

Alternatively, the search term may have no error, but the original information in the data store entry 104 or in the search target 150 may be in error. For example, if the initial creation of the data store entry 104 erroneously entered the account owner name as "robrt brown," when conducting an exact search for a "robert brown" search term will fail to find this entry. The lexicographic similarity-based search taught herein may find this entry in the application data store 102.

Figure 5:
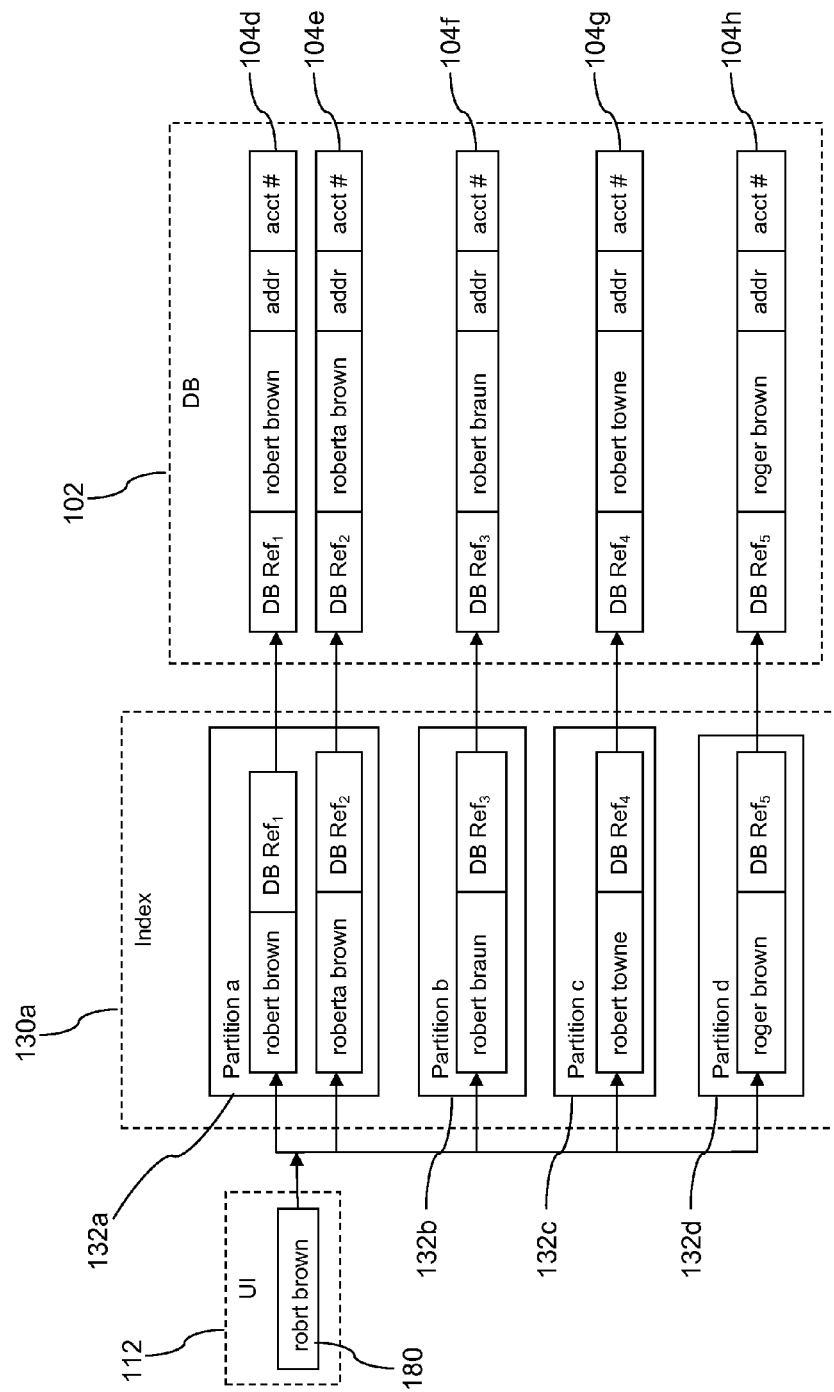
FIG. 5 is an illustration of a lexicographic similarity-based search path according to an embodiment of the disclosure.

Turning now to FIG. 5, an exemplary partitioned lexicographic similarity-based search is described. The user interface 112 may pass a first search term 180 to the search application 118 to conduct the search. The search application 118 calculates a similarity metric of the similarity of the first search term 180 "robrt brown" to each of the collectors 134 of the name index 130a. The search application 118 selects a plurality of collectors 134 based on their similarity to the first search term 180. It should be recalled that each index entry 136 is distributed to one of the collectors 134 based on the similarity of its search target 150 to the collector 134. Hence, by selecting the collectors 134 that are most similar to the first search term 180, it is expected that the index entries 136 with the search targets 150 most similar to the first search term 180 will be found within the partitions 132 associated with the collectors 134 that are most similar to the first search term 180.

In an embodiment, the search application 118 is configured to select a specific number of collectors 134, for example ten collectors, that are most similar to the search term 180. In an embodiment, the search application 118 is configured to select a specific percentage of all the collectors 134, for example 1% of all the collectors, that are most similar to the search term 180. In an embodiment, the search application 118 is configured to select all the collectors 134 with a similarity metric relatively close to the highest calculated similarity metric. In another embodiment, the number of collectors 134 selected by the search application 118 is determined to assure analyzing a minimum number of index entries 136. In an embodiment, the number of collectors 134 selected by the search application 118 is determined to assure analyzing a minimum percentage of all the index entries 136 in the index 130. In an embodiment, two or more of the criteria described above may be combined. For example, in an embodiment, at least ten collectors 134 are searched and if less than 5000 index entries 136 are analyzed, additional collectors 134 are searched. For example, if the ten selected collectors 134 are associated with partitions 132 that contain only a total of 1000 index entries 136, it may be desirable to select additional collectors 134 to assure that at least 5000 index entries 136 are tested for similarity of their search target 150 to the search term 180.

In an embodiment, the number of collectors 134 to select may be based in part on a current search load on the search application 118, for example from a plurality of user interfaces 112 or applications. When the processing load is light, the number of collectors 134 selected may increase within a range of adjustment up to a maximum number, and when the processing load is heavy, the number of collectors 134 selected may decrease within a range down to a minimum number. In an embodiment, the number of collectors 134 to select may be adaptively determined based on feedback about the success rate of the lexicographic similarity-based searches. In another embodiment, yet other methods for determining the number of collectors 134 to select may be employed, all of which are contemplated by the present disclosure. The selection of the collectors 134 may be said also to select the partitions 132 that are associated with the collectors 134.

A similarity metric is determined indicating the similarity of the first search term 180 to the search target 150 of each of the index entries 136 associated with the selected partitions 132. A plurality of the index entries 136 are identified from among the selected partitions 132 whose search targets 150 are determined by the similarity metric to be most similar to the first search term 180, and these index entries 136 may be deemed to be a result or an intermediate result of the lexicographic similarity-based search. The number of the index entries 136 that comprise the result of the lexicographic similarity-based search may be configured in the search application 118. Alternatively, the number of index entries 136 that comprise the result may be input from the user interface 112 when initiating the lexicographic similarity-based search. Alternatively, the number of index entries 136 that comprise the result may be adaptively determined based on feedback about the success rate of the lexicographic similarity-based searches.

The presentation of results to users of the system 100 may vary depending upon the specific application and context, and a variety of manners of presenting the results are contemplated by the present disclosure. In an embodiment, the value of the search targets 150 of each of the index entries 136 that were selected due to similarity to the first search term 180 may be presented, for example in a list of menu selections on a display of the user interface 112 ordered according to the different similarity metric values associated with the results. For example, based on the first search term 180 value "robrt brown," the user interface 112 may display "robert brown," "roberta brown," "robert braun," "robert towne," and "roger brown." The user may be able to click on the "robert brown" result, and the user interface 112 may use the data store entry reference 156 associated with the search target 150 "robert brown," for example DB Ref$_1$, to access and read a corresponding data store entry 104d and to present the information from this data store entry 104d to the user via the user interface 112. For example, the user interface 112 may display robert brown, an address, an account number, and possibly other information. Alternatively, the search application 118 may retrieve the data store entries 104 identified by all of the index entries 136 whose search target 150 were selected due to similarity to the first search term 180 and display at least some of the information retrieved from the application data store 102 for each of the subject data store entries 104. Alternatively, when the index entry 136 does not comprise a data store entry reference 156 but instead comprises the target information component 157, the information stored by the target information component 157 may be presented.

In an embodiment, rather than providing the lexicographic similarity-based search results on a display of the user interface 112, the search application 118 may return the lexicographic similarity-based search results to a calling application. FIG. 5 schematically represents some of the steps described textually above. FIG. 5 includes partitions 132a, 132b, 132c, 132d that may be said to comprise index entries 136 that may have been found to have search targets 150 most similar to the first search term 180. The subject index entries 136 correspond to data store entries 104d, 104e, 104f, 104g, and 104h.

Some search targets 150 may be comprised of a plurality of sub-fields. For example, search targets 150 storing names may comprise a first name sub-field, a middle name sub-field, and a last name sub-field. As another example, search targets 150 storing addresses may comprise a street sub-field, a city sub-field, a state sub-field, a zip-code sub-field, a country sub-field, and other sub-fields. In an embodiment, rather than a street sub-field, the search targets 150 may comprise a street number sub-field and a street name sub-field. Search terms 180, collectors 134, collector symbol strings 158, and/or collector data structures 159 associated with an index 130 where index entries 136 have search targets 150 comprised of a plurality of sub-fields may be composed of parallel sub-fields. The determination of similarity between symbol strings having sub-fields may be determined as a series of similarity metrics that are then combined to form an aggregate or total similarity metric. For example, a similarity metric between symbol strings having a first sub-field, a second sub-field, and a third sub-field may be determined as a first similarity determined over the first sub-fields, a second similarity determined over the second sub-fields, a third similarity determined over the third sub-fields, and an aggregate similarity based on a combination of the first, second, and third similarities.

The aggregate similarity may be determined by summing the similarities of each of the sub-fields. The aggregate similarity may be determined by summing the similarities of each of the sub-fields and dividing through by the number of sub-fields. The aggregate similarity may be determined by multiplying each of the sub-fields by a weighting coefficient that is configured for that specific sub-field and summing the resultant products. The aggregate similarity may be determined by multiplying each of the sub-fields by a coefficient that is configured for that specific sub-field, summing the resultant products, and dividing by the sum of the weighting coefficients. In some indices 130 associated with sub-groups, the weighting coefficients may be based on the semantics of the information to be searched. For example, in a telephone number, the first three digits may provide an area code and may be granted more weight in determining similarity than other sub-groups of the symbol strings. Yet other methods for aggregating similarity metrics determined over sub-fields are contemplated by the present disclosure.

The search term 180 for searching an index 130 having collectors 134 and index entries 136 associated with sub-fields may provide a search string that provides symbols for each of the sub-fields. In another embodiment, however, or in an alternative user interface 112, a search string may be input that provides symbols for some but not all of the sub-fields. In this case, the search application 118 may fill in the empty sub-fields with wildcard symbols: symbols that match any other symbol.

In an embodiment, the index data store 108 is implemented using a traditional database to store its data. As is known to those skilled in the art, databases and/or database tools provide an application programming interface for interacting with data and/or information stored by the database tool. The database tool may create a variety of internal structures to promote rapid searching and/or accessing of data. This traditional database may comprise a PART_TERM table, where PART_TERM may stand for partition terms, and terms are synonymous with index entries 136. There is one record in the PART_TERM table per index entry 136 stored in the index 130. Each record in the PART_TERM table is an index entry 136 that comprises a unique key, the normalized value of the search target 150, original value of the search target 150, data store references 156, collector identity 152 and/or partition identity, etc. The normalized value of the search target 150 may be a symbol string that eliminates punctuation marks such as apostrophes, spaces, and changes the case of all letters to lower case. The collector identity 152 may be a foreign key reference to a PARTITIONS table. The PARTITIONS table contains one record for each partition 132 per index 130. The collector identity 152 foreign key reference relates the index entry 136 to the collector 134 and/or the partition 132. In addition, the collector identity 152 foreign key field also has a database index on it. Thus, the database creates a B+-tree data structure under the covers that promotes requesting records from PART_TERM table by providing a collector identity 152 value, and the PART_TERM table can return all of the index entries 136 associated with the subject collector 134 and/or partition 132 without needing to do an exhaustive scan of every record and/or entry in the PART_TERM table, i.e., without reading all the index entries 136 in the subject index 130.

When a lexicographic similarity-based search is executed by the search application 118, the index entries 136 associated with a selected relatively small number of collectors 134 are read from the index data store 108. However, at this stage of the lexicographic similarity-based search execution, only the normalized value of the search target 150 and the unique key are needed. Thus, the normalized value of the search target 150 has been added to the database index on collector identity 152. When the index data store 108 is queried for all index entries 136 in a specific partition 132, the index data store 108 only needs to consult its b+-tree for collector identity 152 and to return the unique id and the normalized value of the search target 150 of the subject index entries 136. This saves the index data store 108 from having to (a) find all index entries 136 for the partition 132 by using the given collector identity 152, then (b) looking up each in the PART_TERM table to get the normalized value. This is called a covering index, because the index b+-tree structure ordered by the collector identity 152 includes all of the requested information, thereby saving the index data store 108 some work effort. In other embodiments, however, a different implementation may be employed.

It will readily be appreciated that the partitioned lexicographic similarity-based search system 100 described above may be used in a wide variety of contexts. It is contemplated that the system 100 may be employed for performing lexicographic similarity-based searches in banking, in financial services, in medical records, in governmental services, in security, in telecommunications services, in organization member services, and in other applications. For example, in banking, the lexicographic similarity-based search may be used when opening a new account to assure that an already existing account does not conflict in some way with the new account—for example two different John Smith's attempting to open an account in the same bank—and to take any customary process steps to accommodate these circumstances. Also in banking, the lexicographic similarity-based search may be used to identify individuals who may be on a watch list, such as people that have bad credit, that a bank may wish to avoid opening accounts for or lending money to.

A store item that is tagged with a universal product code (UPC) that is corrupted and can only be partially read, for example frost on a UPC tag adhered to a frozen turkey may be identified based on the partial UPC code using the partitioned lexicographic similarity-based search system 100. The lexicographic similarity-based search may be used to look up medical records in a large national database where childhood visits to the family doctor may list a child's name as Tom while the name used by the adult is Thomas. The lexicographic similarity-based search may be used to map from non-canonical names to canonical names, for example complicated medical terms that a lay person may misremember when searching for further data on a condition his or her doctor may have diagnosed. The partitioned lexicographic similarity-based search system 100 or portions thereof may be embedded in other applications as a partitioned lexicographic similarity-based search engine.

It is contemplated that the system 100 may be used in applications for performing lexicographic similarity-based searches over a large number of data entries. Initial tests of prototype implementations of the partitioned lexicographic similarity-based search system 100 have accomplished effective, timely lexicographic similarity-based searches for data stores 102 ranging in size from about one million data store entries 104 to about twenty million data store entries 104. It is thought that the system 100 is scalable for use with quite large data stores 102, for example data stores 102 containing on the order of about one billion to about twenty billion or more data store entries 102, by algorithmic structuring and/or by distributing the search problem across a plurality of computers, for example across a plurality of server computers 106.

The Jaro edit distance algorithm generally determines a metric of the similarity of two symbol strings, for example two strings of letters such as "robed brown" and "robrt brown." While in this example, the symbols are letters or characters, it is understood that the principles would apply to other symbol sets. Without describing the technical details in depth, it can be said that the Jaro edit distance algorithm takes account of the number of matching symbols and the location of matching symbols among the two symbol strings. Further, the Jaro edit distance algorithm provides a self-normalized similarity metric. In an embodiment, to perform the Jaro edit distance algorithm for a first symbol string having n symbols and a second symbol string also having n symbols (note that the algorithm does not constrain the symbol strings being compared to be of equal length) may entail performing many comparisons. For example, for the first symbol in the first symbol string, every symbol in the second symbol string is compared to the first symbol of the first symbol string; for the second symbol in the first symbol string, every symbol in the second symbol string is compared to the second symbol in the first symbol string; and so on. In practice, the algorithm can be implemented with efficiencies to reduce the number of operations somewhat.

In the context of the present disclosure, the efficiency of the similarity metric algorithm is of concern because this operation may be the primary limit on the speed of the optimization application 116 and the search application 118. For example, if the index data store 108 comprises one million index entries 136 distributed to one thousand partitions 132, and if ten partitions 132 are selected for searching, the similarity metric algorithm may be executed eleven thousand times. The similarity metric algorithm is executed to determine the similarity of the search term 180 with each of the one thousand collectors 134: one thousand executions of the similarity metric algorithm. Then the similarity metric algorithm is executed to determine the similarity of the search term 180 with the search target 150 of each of the index entries 136 associated with the ten selected partitions 132. Assuming there are about one thousand index entries 136 associated with each partition 132, this makes ten times one thousand equals ten thousand executions of the similarity metric algorithm, and thus a total of eleven thousand executions of the similarity metric algorithm.

In an embodiment, an enhanced Jaro edit distance algorithm is used to calculate the similarity metric between the search targets 150 and the collectors 134, between the search term 180 and the collectors 134, and between the search term 180 and the search targets 150. It is a characteristic of the system 100 that collectors 134 and index entries 136 are created relatively rarely but are involved in calculations of the similarity metric relatively often. In an embodiment, the collectors 134 and the search targets 150 of the index entries 136 are analyzed when the collectors 134 and the index entries 136 are first created. Based on the analysis, a data structure that represents the symbol content and positions of the symbols in the collectors 134 and the search targets 150 is created and becomes part of the collectors 134 and the index entries 136. For example, a collector data structure 159 is created based on the collector symbol string 158 of each of the collectors 134, and a search target data structure 154 is created based on the search target 150 of each of the index entries 136.

The data structures 154, 159 promote execution of an enhanced Jaro edit distance algorithm that need not repeatedly parse a given collector 134 or a given search target 150 to know whether a given symbol found in the search term 180 is present or where it is present in the subject collector 134 or subject search target 150. While additional processing effort is entailed in the initial creation of the collectors 134 and the search targets 150 having the data structure 154, 159, because of the high number of times the data structures 154, 159 are used in calculating similarity metrics, this initial investment of processing effort may be paid back many times over with increased efficiency in calculating the similarity metrics. Further, the additional processing effort to create the collector data structure 159 and the search target data structure 154 may be done in a batch processing operation mode that does not interfere with partitioned lexicographic similarity-based searches.

Figure 6:
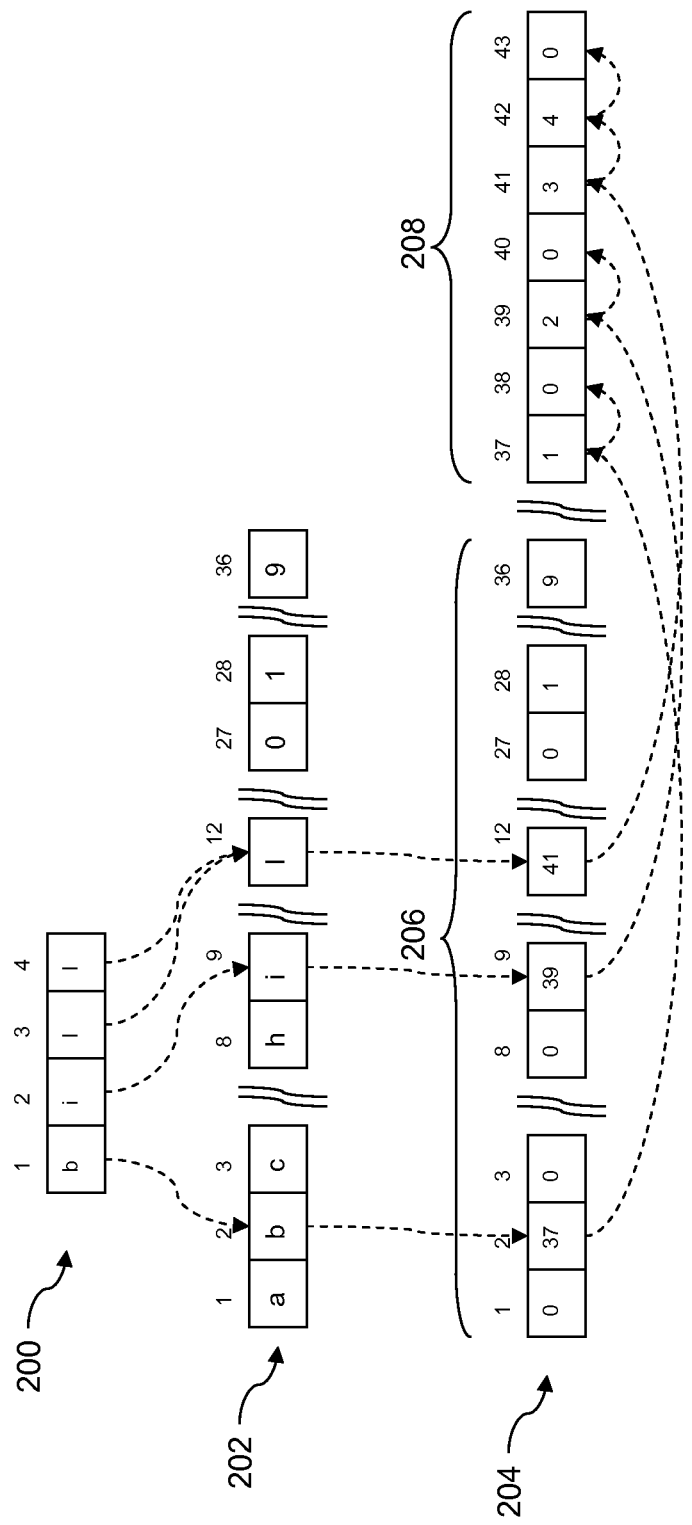
FIG. 6 is an illustration of a search target data structure according to an embodiment of the disclosure.

Turning now to FIG. 6, an exemplary search target data structure 154 is described. In an embodiment, the search target data structure 154 may comprise an array 204 comprising a first group of elements 206 that correspond in number to the number of symbols in an ordered symbol set 202 used to create search terms 180, search targets 150, and collectors 134. For example, in the case of an ordered symbol set comprising English alphabetic characters and roman numerals (note for this simple illustration the case of the alphabetic characters is ignored, but in an embodiment, the symbol set could be extended to comprise 26 small alphabetic letters and 26 capital alphabetic letters), the first group of elements 206 may comprise 36 elements: 26 elements for each of the letters of the English alphabet ordered in alphabetic order and 10 elements for each of the digits 0 through 9 ordered according to increasing value. The first element of the array 204 may be associated with the first symbol in the ordered symbol set 202, the second element of the array 204 may be associated with the second symbol in the ordered symbol set 202, etc. Each of the elements of the array 204 contain either a zero, indicating that none of the corresponding symbols are present in the subject symbol string 200, for example a search target 150, or a positive integer indicating that at least one of the corresponding symbols is present in the symbol string 200 and indicating a location in the array 204 among a second group of elements 208 where information identifying how many of the subject symbol are present in the subject symbol string 200 and what their locations are in the symbol string 200. The first group of elements 206 comprise a fixed number of elements, and the second group of elements 208 comprise a variable number of elements.

For example, given the symbol string 200 "bill", the first element of the array 204 would contain a '0' value, because "bill" contains no 'a' symbols. The second element of the array 204 would contain a '37' value to indicate that at least one 'b' is present in the symbol string 200 and to indicate what element of the array 204 contains further information about the position of the letter 'b' in the symbol string 200. The 37th element of the array 204 would contain the value '1' indicating that the letter 'b' is in the first position of the symbol string 200. The $38^{th}$ element of the array 204 would contain a '0' value to indicate that there are no further occurrences of the letter 'b' in the symbol string 200. The third element through the eighth element of the array 204 each contain the value '0' to indicate there are no symbols from the set c, d, e, f, g, or h in the symbol string 200. The ninth element of the array 204 would contain a '39' value to indicate that at least one 'i' is present in the symbol string 200 and to indicate what element of the array 204 contains further information about the position of the letter T in the search string 200. The $39^{th}$ element of the array 204 would contain a '2' value indicating that the letter T is in the second position of the symbol string 200. The $40^{th}$ element of the array 204 would contain a '0' value to indicate that there are no further occurrences of the letter T in the search string 200.

The tenth and eleventh elements of the array 204 would each contain the value '0' to indicate that there are no symbols from the set j or k in the symbol string 200. The twelfth element of the array 204 would contain a '41' value to indicate that at least one 'l' is present and to indicate what element of the array 204 contains further information about positions of the letter 'l' in the symbol string 200. The $41^{st}$ element of the array 204 would contain a '3' value indicating that the letter 'l' is in the third position of the symbol string 200. The $42^{nd}$ element of the array 204 would contain a '4' value indicating that the letter 'l' is also in the fourth position of the symbol string 200. The $43^{rd}$ element of the array 204 would contain a '0' value indicating that there are no further 'l' letters in the symbol string 200. The remaining elements of the first group of elements 206—thirteenth element through thirty-sixth element—each contain a '0' value indicating that the symbol string 200 contains none of the corresponding letters or numerals.

Any of the collectors 134, for example the collector symbol string 158, the search targets 150, and the search term 180 may be mapped using the array 204. In some embodiments, the search term 180 may not be mapped at all but rather parsed on every execution of the determination of the similarity metric involving the search term 180. Alternatively, the search term 180 may be mapped to a search term data structure comprising an array of integers indicating which position of the symbol set 202 corresponds to each position in the search term 180. For example, the search term 'billy' could be mapped to an array of integers {2, 9, 12, 12, 25, 0}, where the 0 value indicates the end of the search term 180. Again, because the similarity metric is calculated many times for a search term 180, the extra computational effort of building a search term data structure may be rewarded by increased efficiency achieved in the calculation of the similarity metric.

One skilled in the art will readily appreciate the reduced number of operations used to determine an edit distance between the search term "billy" mapped to an array of integers and the array 204 described above with reference to the number of operations used by a standard Jaro edit distance algorithm performed on two symbol strings. Further, in an embodiment, the use of the data structures 154, 159 to determine edit distance between two symbol strings may promote cache operation improvements when executing the applications 114, 116, 118, for example as a result of improved cache locality.

It is understood that the present disclosure contemplates alternative implementations of the data structures 154, 159 as well as the search term data structure. For example, in an embodiment, one of the elements of first group of elements may contain a '−1' value to indicate that none of the following symbols in the first group of elements 206 of the array 204 are present in the represented symbol string and may promote shortening the similarity analysis of the subject symbol string 200. For example, in the exemplary case of the symbol string "bill," the $13^{th}$ element of the array may contain a '−1' value indicating that there are no other symbols contained in the symbol string 200 and further processing of the array 204 can be avoided. As a further refinement, the order symbols of the array 204 need not follow the canonical order of the symbol set 202, for example alphabetic order, and instead may be ordered according to a frequency of occurrence of symbols from most frequently occurring symbols to least frequently occurring symbols. This non-canonical ordering of symbols in the array 204 may promote greater shortening of the similarity analysis. The frequency of occurrence may be based on standard frequency of occurrence statistics. It is understood that the use of non-canonical ordering of symbols may be employed for each of the indices 130 and that different symbol frequency statistics may apply for each different index 130.

Alternatively, the frequency of symbol occurrence statistics may be determined by the applications 114, 116 when distributing index entries 136 to partitions 132. An additional housekeeping type of operation may be defined that redefines the order of symbols in the array 204 and rebuilds the collectors 134 of the partitions 132 based on the redefined symbol order. The search target data structures 154 of each of the index entries 136 may be revised in accordance with the changed collectors 134 or alternatively the index entries 136 may simply be redistributed to the partitions based on either executing the initialization application 114 or the optimization application 116. The redefinition of symbol order in the array 204 may be performed periodically or based on some triggering event such as determining that the accumulated statistics of symbol frequency occurrence has changed beyond a threshold amount since the previous redefinition of symbol order in the array 204.

As another refinement, in an embodiment, elements in the array 204 that are not associated with a symbol in the symbol string 200 may provide an index to the next element in the array 204 that is associated with a symbol in the symbol string 200. For example, element 3 of array 204 may contain a '−9' value to indicate that the next non-zero value in the array 204 occurs at the ninth array element, allowing the analysis to skip over array elements 4-8 and proceed directly to array element 9. Likewise, element 10 of array 204 may contain a '−12' value to indicate that the next non-zero value in the array 204 occurs at the twelfth array element, allowing the analysis to skip over array element 11 and proceed directly to array element 12.

One skilled in the art will readily appreciate that there may be tradeoffs between the efficiency gains of implementing such elaborations versus the additional complexity added to the logic of the applications 114, 116, 118. The benefit provided by some of these elaborations may depend on the character of the search terms 180 and/or the search targets 150. It is understood that applications 114, 116, 118 may comprise different procedures and/or algorithms directed to some of the indices 130. For example, the search target data structures 154 and the collector data structures 159 associated with the first index 130*a* may be determined based on structuring the array 204 according to a canonical symbol order, and the search target data structures 154 and the collector data structures 159 associated with the second index 130*b* may be determined based on structuring the array 204 according to a non-canonical symbol order. These differences may be defined in the schemas 138, discussed below with reference to FIG. 7.

The information stored in the elements of the array 204 may be different from integers, for example real number type data or character type data. For example, rather than the array 204, a linked list data structure might be used. Additionally, the array 204 may be structured in a different way in the second group of elements 208. For example, rather than using an array element having a '0' value to indicate there are more symbols of the subject type, the number of symbols of the subject type, for example the number of '1', may be embedded in the integer contained in the first location—for example in the two most significant bits of an 8 bit integer, the five most significant bits of a 16 bit integer, or some other coding pattern. The present disclosure contemplates yet other implementations of the search data structures and the search term data structure.

In an embodiment, one or more domain specific similarity metric calculation algorithms may be employed to determine the similarity between search targets 150 and collectors 134, between search terms 180 and collectors 134, and between search terms 180 and search targets 150. Domain specific similarity metric calculations may be employed to determine similarity based on a variety of different kinds of distances, for example the distance between different symbols as laid out on a keyboard, for example a QWERTY keyboard; geographic distances; phonetic distances; magnetic scanning distance; optical scanning distance; and others. For example, a magnetic distance may be determined between a misread magnetic strip on a credit card and a stored value of the magnetic strip.

A domain specific similarity metric calculation algorithm may take into account semantics of a symbol string, for example a string of 10 digits forming a phone number, a string of 9 digits forming a social security number, a time and date stamp, a set of global positioning system (GPS) coordinates, a set of latitude and longitude coordinates, and other semantics. Domain specific similarity metric calculation algorithms may be used to determine geographic similarity, for example the distance between two global positioning system coordinates. A domain specific similarity metric calculation algorithm may be used to determine similarity between a magnetic ink character recognition (MICR) data read from a check and a MICR string stored in a database. Such a MICR similarity metric calculation algorithm may take into account the specific characteristics of MICR strings to develop insight into a distance between an automatically read MICR string and a stored MICR string. A domain specific similarity metric calculation algorithm may be used to determine a similarity between an automatically read vehicle identification number (VIN) and a VIN stored in a database. A VIN similarity metric calculation algorithm may take into account the particular structure of VINs to determine a distance between an automatically read VIN and a stored VIN. Domain specific similarity metric calculation algorithms may be used to determine similarity of automatically read to stored universal product codes, bar codes, and two dimensional bar codes. Domain specific similarity metric calculation algorithms may be used to determine the similarity between different phonetic representations of spoken words. Domain specific similarity metric calculation algorithms may be used to determine the similarity between different magnetic strip value strings. Other domain specific similarity metric calculation algorithms are contemplated by the present disclosure. Domain specific similarity metric calculation algorithms may be defined for determining a distance between automatically determined DNA sequences and a stored DNA sequence. Domain specific similarity metric calculation algorithms may be defined for determining a distance between an automatically scanned signature and a stored signature.

Figure 7:
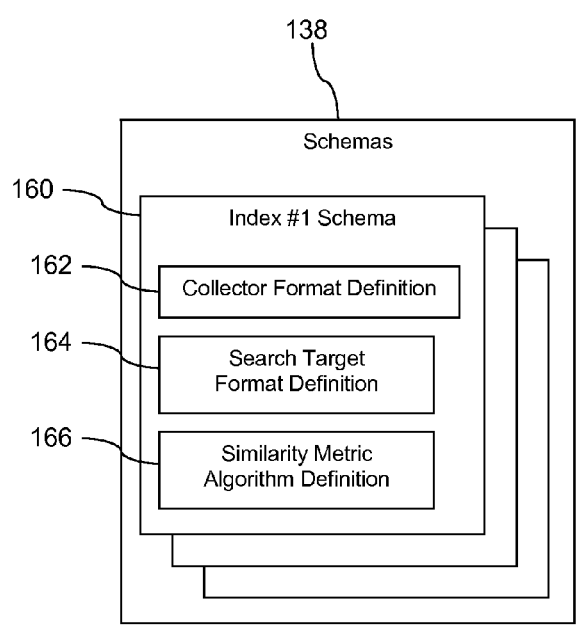
FIG. 7 is a block diagram of a plurality of schemas for using an index data store according to an embodiment of the disclosure.

Turning now to FIG. 7, an embodiment of the schemas 138 is described. The schemas 138 are not the same as the schemas employed in database technologies. In database technologies, a schema may define the elements of database tables, the relationships among database tables, the structure of database tables in terms of column arrangements and data types of columns, various keys, and other information needed to support standard interactions with the database. The schemas 138, however, define information that is employed by the applications 114, 116, 118 to perform partitioned lexicographic similarity-based searches. In some contexts, the schemas 138 may be referred to as similarity-based search schemas.

The schemas 138 may optionally be part of the index data store 108 to promote flexibility and/or configurability of the applications 114, 116, 118. In an embodiment, a schema 160 may comprise a collector format definition 162 that defines the format of the collector 134. For example, the collector format definition 162 may define the symbol set from which the collectors 134 of an index 130 is composed and the number of symbols in the subject collectors 134. The schema 160 may further comprise a search target format definition 164 that defines the format of the search targets 150 of the index entries 136 associated with the subject index 130. The schema 160 may further comprise a similarity metric algorithm definition 166 that identifies a similarity metric algorithm that is used to calculate a similarity metric with reference to operations on the subject index 130. A different schema 160 may be defined for each index 130.

Figure 8:
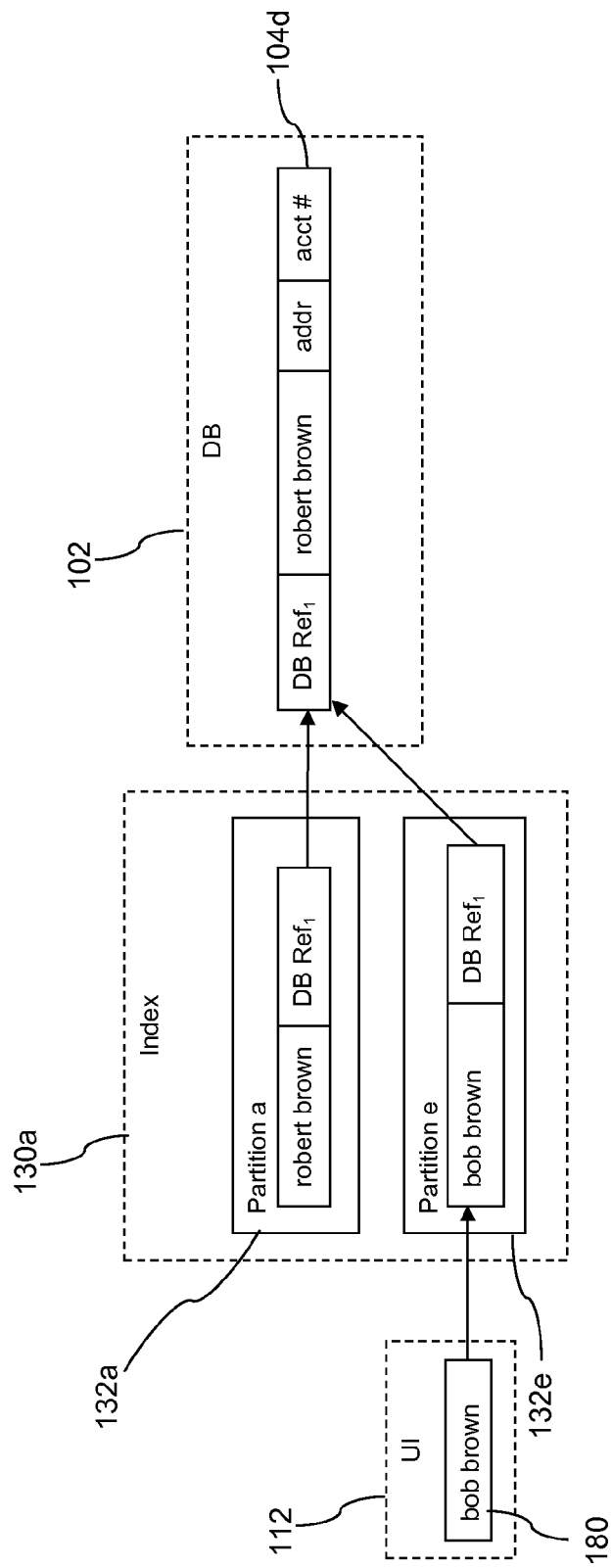
FIG. 8 is an illustration of an alias index entry in an index data store according to an embodiment of the disclosure.

Turning now to FIG. 8, an optional aliasing feature of the partitioned lexicographic similarity-based search system 100 is described. In an embodiment, it may be desirable to define a plurality of index entries 136 in a single index 130 each referring back to the same data store entry 104. For example, robert brown may be known to some people as "robert brown," as "bob brown" to other people, as "bobby brown" to other people, and as "bubba brown" to yet other people. In some applications it may be useful to be able to find the "robert brown" data store entry 104*d* when any of these alternative names are entered into the user interface 112 as a search term 180.

When initializing the index data store 108 or at some later time, index entries 136 that alias another index entry 136 may be created. For example, an index entry 136 can be created having a search target 150 with the value "bob brown" and the data store entry reference 156 "DB Ref1" which therefore points to the same data store entry 104*d* as does the index entry 136 having the search target 150 "robert brown." Note that the alias index entry 136 will be distributed to a partition 132 based on its search target 150 "bob brown" and given the difference from "robert brown," the alias index entry 136 may be distributed to a different partition 132 from the partition 132 to which the index entry 136 having the search target 150 "robert brown" is distributed. The alias feature described above with respect to alternative names and/or nicknames is applicable to other circumstances. For example, sometimes a single physical building may be referred to by two different addresses. By creating a primary index entry 136 and an alias index entry 136 in an address index 130*b*, a lexicographic similarity-based search based on either of the alternative addresses may find the same data store entry 104 associated with the subject building. The aliasing concept is readily applied to index entries 136 that do not have the data store entry reference 156 and instead comprise the target information component 157.

Figure 9:
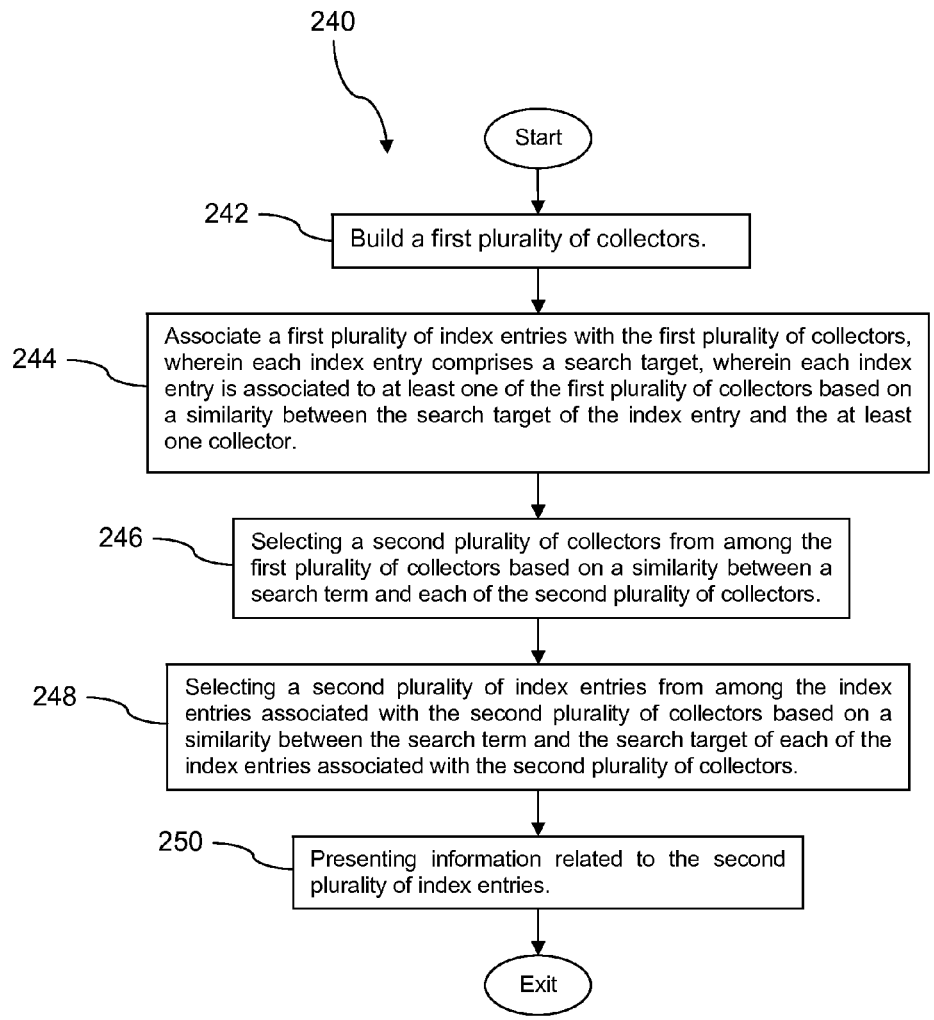
FIG. 9 is an illustration of a method according to an embodiment of the disclosure.

Turning now to FIG. 9, a method 240 is described. At block 242, a first plurality of collectors 134 is built. The format of the collectors 134 may be defined by the collector format definition 162 in the schema 160. In an embodiment, the plurality of collectors 134 may be built using a genetic algorithm. Alternatively, the first plurality of collectors 134 may be built using another algorithm, for example a deterministic algorithm based on analyzing the search targets 150 of the index entries 136. As discussed further above, a variety of genetic algorithms are contemplated for evolving a set of collectors 134 to adapt the partitions 132 in accordance with a fitness metric. Additionally, as discussed further above, the process of evolving the set of collectors 134 may involve evolving through several generations of collectors 134 to improve the fitness of the collectors 134 and/or the partitions 132, for example iterating the process of evolving several times.

The genetic algorithm may comprise comparing a plurality of collectors 134 to a fitness criterion—for example the desirable number of index entries 136 attracted to the collectors 134—and mutating at least one of the collectors 134 to build a new collector 134, where the at least one of the collectors 134 is selected based on the comparison of the at least one of the collectors 134 to the fitness metric. The new collector 134 may be formed by mutating a collector 134 using any mutation method, several of which are disclosed above.

In an embodiment, the collectors 134 may each comprise a symbol string composed from a common symbol set, for example an alphabet, a set of numerals, or another set of symbols. For example, one symbol set may have 36 symbols that comprise the letters of the English alphabet (ignoring case) and the digits 0 through 9. In other cases, however, other symbol sets may be used. The symbol set may also be defined in the collector format definition 162 or perhaps in a separate portion of the schema 160. The collectors 134 may comprise a plurality of components, for example the collector symbol string 158 and a collector data structure 159, where the collector symbol string 158 may comprise a string of the symbols and the collector data structure 159 may represent the string of symbols in a way which promotes efficient determination of similarity metrics between the collector 134 and other symbol strings, for example a search target 150 of an index entry 136 and/or a search term 180. Building the collectors 134 may comprise analyzing the collector symbol string 158 to form the collector data structure 159, as described above with reference to FIG. 6. In an embodiment, each of the collectors 134 and/or the collector symbol strings 158 may have the same number of symbols.

At block 244, a first plurality of index entries 136 are associated with the first plurality of collectors 134. Each index entry 136 comprises a search target 150 associated with at least one of the first plurality of collectors 134 based on a similarity between the search target 150 of the index entry 136 and the at least one collector 134, for example the collector symbol string 158. The similarity between the search target 150 and the at least one collector 134 may be determined by using any algorithm for calculating similarity, for example the algorithms for calculating similarity described above and/or other algorithms. In an embodiment, the similarity may be determined by an edit distance algorithm, for example a Jaro edit distance algorithm or an enhanced Jaro edit distance algorithm.

In an embodiment, some of the index entries 134 may be associated with two collectors 134 and/or partitions 132. For example, when a search target 150 of an index entry 136 has similarity metric values for two different collectors 134 that are close in value and are the two highest similarity metric values for the index entry 136 compared to all the collectors 134, the index entry 136 may be associated with both collectors 134 and/or both partitions 132. In this way, if a search term 180 selects one of the two collectors 134, the index entry 136 will be tested for similarity of its search target 150 to the search term 180. In an embodiment, the index entry 136 may have a plurality of collector identities 152 and further may include information about the similarity metric values associated with each of the collectors 134 in each of the collector identities 152. In some contexts, this may be referred to as fuzzy partitioning, because some of the index entries 136 may be "fuzzily" assigned to a plurality of partitions 132. It is understood that index entries 136 in the embodiment employing fuzzy partitioning may notwithstanding be associated with one and only one collector 134 and/or partition 132, as when the second highest similarity metric representing the similarity between the collector 134 and another collector 134 is below a minimum threshold for associating with the second collector 134.

The associations of index entries 136 with the first plurality of collectors 134 may have been determined during the processing of block 242. For example, to evaluate the fitness of the first plurality of collectors 134 the similarity between the collectors 134 and the search targets 150 may be determined, the preferred association of index entries 136 with collectors 134 may be determined based on the similarities, and the associations may be saved in random access memory (RAM) or in cache or in some other process memory. Alternatively, after the collectors 134 have been finalized, the similarity between the search target 150 of the index entries 136 and the collector symbol string 158 of the collectors 134 may again be analyzed, and the index entries 136 distributed to the collectors 134 and/or the partitions 132. The processing of block 244 may comprise assigning the collector identity 152 of the index entry 136 to identify the collector 134 and/or partition 132 with which the index entry 136 is associated. In an embodiment, the processing of blocks 242 and 244 may comprise either of the initialization of the index data store 108 or the optimization of one or more indices 130. As described further above, the process of updating the collector identities 152, for example the processing of block 244, takes time, and care may be taken to handle lexicographic similarity-based searches that are conducted during the process of reassigning the collector identities 152.

After block 244, a search term 180 may be received by the search application 118 for conducting a partitioned lexicographic similarity-based search. For example, another application invokes an application programming interface (API) of the search application 118 to provide the search term 180 or the user interface 112 provides the search term 180. It is understood that the search term 180 is composed of symbols from the same symbol set used to compose the collector 134, for example the collector symbol string 158, and the search target 150.

At block 246, a second plurality of collectors 134 are selected from among the first plurality of collectors 134 based on a similarity between the search term 180 and the collector 134, for example between the search term 180 and the collector symbol string 158. Any of the algorithms for calculating similarity metrics described above as well as other algorithms for calculating similarity metrics may be employed to evaluate the similarity between the search term 180 and the collector 134.

The second plurality of collectors 134 may be selected based on the calculated similarity metric and based on another criterion, for example a minimum number of collectors 134 and/or partitions 132 and/or a minimum number of index entries 136 associated with the second plurality of collectors 134. For example, the five collectors 134 found to be most similar to the search term 180 are selected. Alternatively, the ten collectors 134 found to be the most similar to the search term 180 are selected. Alternatively, some other number of collectors 134 is selected. Conceptually, the similarity metrics of all the collectors 134 can be listed in order according to similarity, and given a desired number N, the N most similar collectors 134 can be selected as the first N collectors 134 in the ordered list.

At block 248, a second plurality of index entries 136 are selected from among the index entries 136 associated with the second plurality of collectors 134 based on a similarity between the search term 180 and the search targets 150 of each of the index entries 136 associated with the second plurality of collectors 134. The similarity between the search term 180 and the search targets 150 may be determined in a manner similar to that described for block 246 above, as described elsewhere above, or according to different algorithms. For example, if ten thousand index entries 136 are associated with ten collectors 134 that comprise the second plurality of collectors 134, ten thousand similarity metric values are calculated, and some fraction of those index entries 136 are selected based at least in part on the similarity between the search term 180 and the search targets 150 of the index entries 136 associated with the second plurality of collectors 134. For example, all index entries 136 that exceed a specified threshold of similarity with the search term 180 are selected as the first plurality of index entries 136. Alternatively, the index entries 136 are ordered according to similarity, and the M most similar index entries 136 are selected as the first plurality of index entries 136.

At block 250, information related to the second plurality of index entries 136 is presented, for example displayed on the user interface 112. The information may be stored in the target information component 157, for example a canonical name for a medical procedure. Alternatively the information may comprise information stored in the application data store 102 that is retrieved using the optional data store entry reference 156. Additionally, the search target 150 of each of the first plurality of index entries 136 may be presented. The information that is presented may be presented ordered based on the similarity metric value, for example with the information associated with the index entries 136 that were found to be most similar to the search term 180 listed first. Lexicographic similarity-based search metrics may be presented along with the search targets 150. For example, the similarity order of the collector 134 to which the corresponding index entry 136 was associated may be displayed. The similarity metric determined for the similarity between the search term 180 and the search target 150 of the corresponding index entry 136 may be presented. Presenting such information about the conduct of the lexicographic similarity-based searches may promote adapting or tuning the search application 118 and/or the index data store 108, for example using the user interface 112 to invoke commands on the applications 114, 116, 118 to tune one or more execution configuration parameters.

Figure 10:
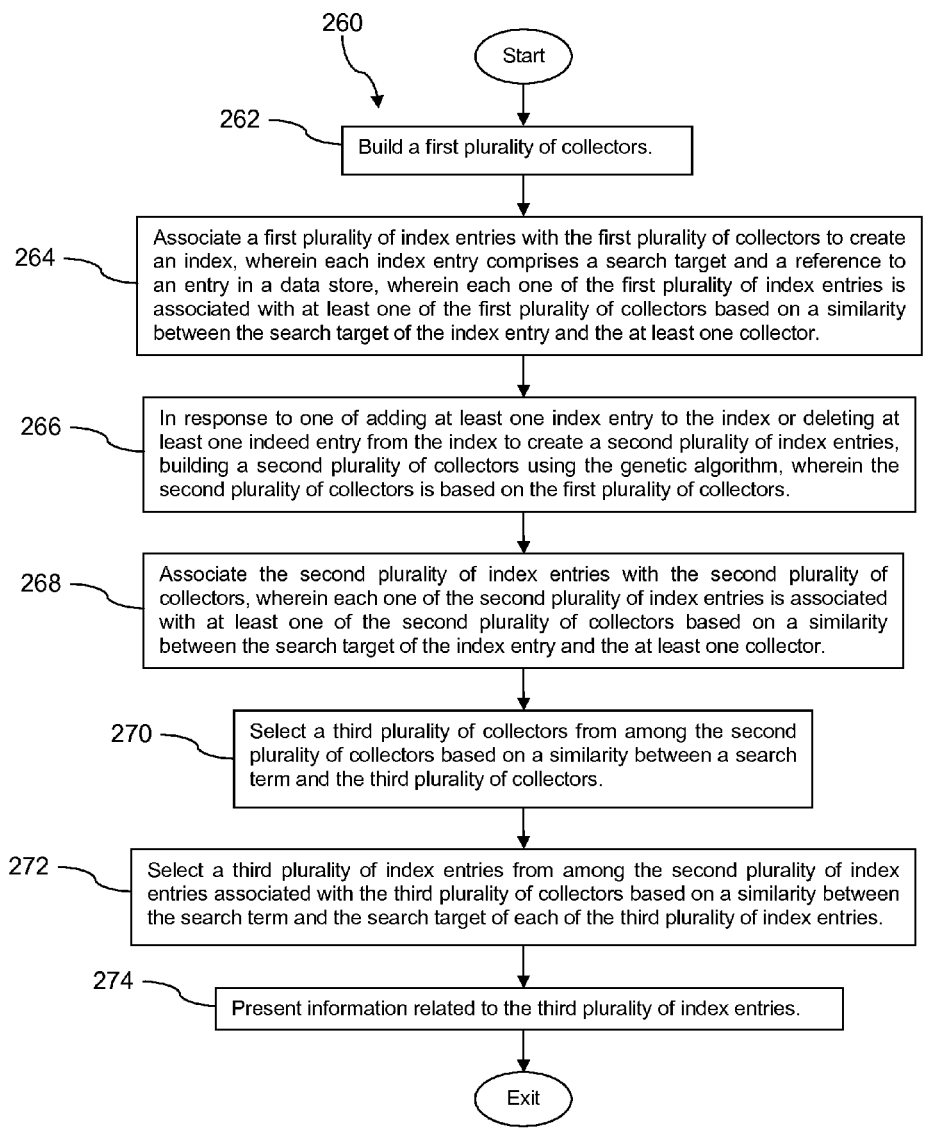
FIG. 10 is an illustration of a method according to an embodiment of the disclosure.

Turning now to FIG. 10, a method 260 is described. At block 262, a first plurality of collectors 134 are built. The first plurality of collectors 134 may be built using a genetic algorithm or a deterministic algorithm based on analysis of the index entries 136. The processing of block 262 may be conducted similarly to the processing of block 242 described above with reference to FIG. 9 and method 240. At block 264, a first plurality of index entries 136 are associated with the first plurality of collectors 134 to create an index 130. Each index entry 136 in the subject index 130 comprises a search target 150 and one of the data store entry reference 156 or the target information component 157. Each of the first plurality of index entries 136 is associated with at least one of the first plurality of collectors 134 based on a similarity between the search target 150 of the index entry 136 and the at least one collector 134 and/or collector symbol string 158. The processing of block 264 may be conducted similarly to the processing of block 244 described above with reference to FIG. 9 and method 240. In an embodiment, some of the index entries 136 may be associated with two or more collectors 134 and/or partitions 132 as described above with reference to FIG. 9 block 244 and to fuzzy partitioning.

A plurality of lexicographic similarity-based searches may be conducted in a manner similar to that described above. Further, after the processing of block 264 has been completed new index entries 136 can be added to the subject index 130 and associated with collectors 134 and/or partitions 132. Likewise, some index entries 136 may be deleted from the subject index 130. As these additions and deletions of index entries 136 take place, the partitions 132 may become less fit for partitioned lexicographic similarity-based searches. For example, some partitions 132 may become undesirably small (associated with relatively too few index entries 136) and other partitions 132 may become undesirably large (associated with relatively too many index entries 136). Either of adding or deleting index entries 136 creates a second plurality of index entries 136 that comprises all the index entries 136 that are present in the first plurality of index entries 136, excepting any deleted index entries 136, and further including any added index entries 136 that are not comprised in the first plurality of index entries 136.

At block 266, in response to either adding at least one index entry 136 to the subject index 130 or deleting at least one index entry 136 from the subject index 130, which may be referred to as a second plurality of index entries 136, building a second plurality of collectors 134 using the genetic algorithm, wherein the second plurality of collectors 134 is based on the first plurality of collectors 134. The second plurality of collectors 134 may contain many of the collectors 134 present in the first plurality of collectors 134, but the first and second plurality of collectors 134 are not identical. The second plurality of collectors 134 may be missing some collectors 134 that are present in the first plurality of collectors 134 and may have other new collectors 134 that are mutated from one or more collectors 134 of the first plurality of collectors 134. A variety of methods of mutating new collectors 134 from old collectors 134 associated with partitions 132 that may contain too many index entries 136 is described further above. Any of these mutation methods may be used to generate new collectors 134.

This processing can comprise determining the similarity metric between the search targets 150 of all the index entries 136 in the subject index 130 with each of the collectors 134 in the second plurality of collectors 134 to identify a preferred partitioning of the index entries 136, determining a fitness of this preferred partitioning, and possibly reiterating the process of generating collectors 134 using the mutation process, and then again determining the fitness of the resulting partitions 132. This may be referred to as evolving or optimizing the partitions 132, and the process of repeatedly mutating a population, determining a fitness of the new population, and again mutating the population can be considered to be a genetic algorithm. In an embodiment, the optimization application 116 may perform the processing of block 266 and the following block 268.

In an embodiment, the optimization process is conducted while the search application 118 remains in service, hence in the presence of lexicographic similarity-based searches conducted in the indices 130. The processing of block 266 described above may be accomplished without changing the partitions 132 in the index data store 108, for example by storing the results of the evolution cycles in random access memory, in cache, or in other memory separate from the index data store 108. When the optimization application 116 has evolved the collectors 134 to a satisfactory point—for example when the collectors 134 are determined to satisfy a minimum fitness standard or after a maximum number of evolution cycles—the second plurality of index entries 136 are redistributed to the second plurality of collectors 134, by writing to the collector identities 152 of the index entries 136 that have moved. Alternatively, once the collectors 134 have been determined, the similarities between the search target 150 of the index entries 136 and the collector symbol string 158 of the collectors 134 may be determined again and the index entries 136 distributed appropriately to the collectors 134 and/or the partitions 132. It is contemplated that the optimization procedure may be time consuming, so the optimization process may be designed to support interruption and pausing without interfering with partitioned lexicographic similarity-based searching.

Because the updating of collector identities 152 may take a period of time, while the updating of collector identities 152 are ongoing, the lexicographic similarity-based searches are performed against both the old set of partitions 132 and the new set of partitions 132. While the second plurality of index entries 136 are having their collector identities 152 updated, some index entries 136 will be located in the old partitions 132 and other index entries 136 will be located in the new partitions 132 (wherein "located in" a given partition 132 simply means the collector identity 152 of the subject index entry 136 identifies the collector 134 of the partition 132). Thus, by searching both sets of collectors 134 and/or partitions 132, index entries 136 that are similar to the search term 180 are less likely to be missed.

Lexicographic similarity-based searches begun after the second plurality of index entries 136 have all been migrated to the second plurality of collectors 134 may only search among the second plurality of collectors 134 and/or partitions 132. The first plurality of collectors 134—or those collectors 134 that are not located in the second plurality of collectors 134—are deleted only after the last lexicographic similarity-based search begun before the second plurality of index entries 136 have all been migrated over to the second plurality of collectors 134 and/or partitions 132.

The optimization operation may be executed periodically, for example about weekly, about monthly, or at some other periodic interval. The optimization operation may be scheduled to occur during intervals of low activity, for example during early morning hours and/or on weekends. The optimization operation may be completed in portions, for example a first portion on a first morning, a second portion on a second morning, and a final third portion on a third morning. The optimization operation may be triggered by the determination that a fitness threshold has been exceeded, and the optimization may start immediately or be deferred to the next preferred optimization scheduling opportunity, for example early in the morning and/or on a weekend. In an embodiment, optimization is designed to reduce the risk that a lexicographic similarity-based search conducted while optimization is taking place may produce an incorrect and/or a less accurate search result.

At block 268, the second plurality of index entries 136 is associated with the second plurality of collectors 134, wherein each one of the second plurality of index entries 136 is associated with at least one of the second plurality of collectors 134 based on the similarity between the search target 150 of the index entry 136 and the at least one collector 134. For example, the collector identity 152 of some of the second plurality of collectors 134 is overwritten with the identity of a collector 134 to which the subject index entry 136 have been moved to. The determination of similarity may be performed as described above in block 264. After block 268, a search term 180 may be received by the search application 118 for conducting a partitioned lexicographic similarity-based search, for example as described above with reference to FIG. 9 and block 244. At block 270, a third plurality of collectors 134 from among the second plurality of collectors 134 is selected based on a similarity between the search term 180 and the third plurality of collectors 134. The similarity between the search term 180 and each of the second plurality of collectors 134 may be determined substantially as described above.

At block 272, a third plurality of index entries 136 is selected from among the second plurality of index entries 136 associated with the third plurality of collectors 134 based on a similarity between the search term 180 and each of the third plurality of index entries 136. The similarity between the search term 180 and each of the search targets 150 of the second plurality of index entries 136 may be determined substantially as described above. The third plurality of index entries 136 may be considered to be lexicographic similarity-based search results and/or intermediate lexicographic similarity-based search results. The third plurality of index entries 136 may comprise the desired search results, for example stored in the target information component 157 of the index entries 136, or may comprise a reference to the desired search results, for example stored in the optional data store entry reference 156 of the index entries 136. At block 274, information obtained by the lexicographic similarity-based search is presented substantially similarly to the presentation of results described above with reference to FIG. 9 block 250.

Figure 11:
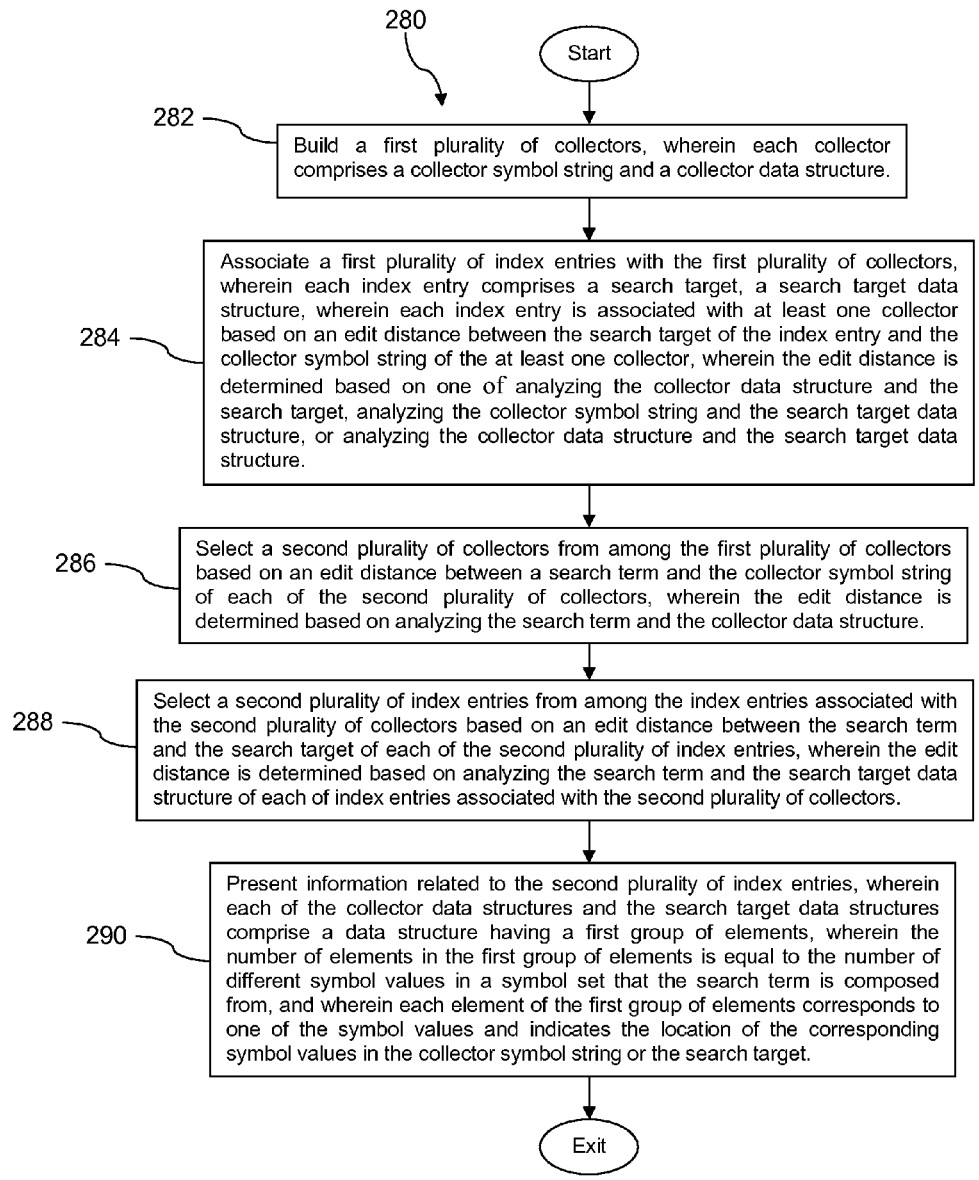
FIG. 11 is an illustration of a method according to an embodiment of the disclosure.

Turning now to FIG. 11, a method 280 is described. At block 282, a first plurality of collectors 134 is built, wherein each collector 134 comprises a collector symbol string 158 and a collector data structure 159. At block 284, a first plurality of index entries 136 is associated with the first plurality of collectors 134. Each index entry 136 comprises a search target 150, a search target data structure 154, and one of a data store entry reference 156 or the target information component 157. Each index entry 136 is associated with at least one collector 134 based on an edit distance between the search target 150 of the index entry 136 and the collector symbol string 158 of the at least one collector 134. The index entry 136 may be associated with the collector 134 that is determined to be most similar to the index entry 136, for example the search target 150 is determined to be most similar to the subject collector symbol string 158. Alternatively, the index entry 136 may be associated with two or more collectors 134 that are determined to be most similar to the index entry 136, as for example when the index entry 136 is treated with a fuzzy partitioning technique. The edit distance is determined based on one of analyzing the collector data structure 159 and the search target 150, analyzing the collector symbol string 158 and the search target data structure 154, or analyzing the collector data structure 159 and the search target data structure 154. After block 284, a search term 180 may be received by the search application 118.

Each of the collector data structures 159 and the search target data structures 154 comprise a data structure having a first group of elements 206. The number of elements in the first group of elements 206 is equal to the number of different symbol values in a symbol set that the search term 180 may be composed from. Each element of the first group of elements 206 corresponds to one of the symbol values and indicates the presence or absence of the corresponding symbol values in the collector symbol string 158 or the search target 150.

At block 286, a second plurality of collectors 134 is selected from among the first plurality of collectors 134 based on an edit distance between the search term 180 and the collector symbol string 158 of each of the second plurality of collectors 134, wherein the edit distance is determined based on analyzing the search term 180 and the collector data structure 159. The second plurality of collectors 134 may be the collectors 134 that are determined to be most similar to the search term 180, for example the collector symbol strings 158 are determined to be the most similar to the subject search term 180. At block 288, a second plurality of index entries 136 is selected from among the index entries 136 associated with the second plurality of collectors 134 based on an edit distance between the search term 180 and the search target 150 of each of the index entries 136 associated with the second plurality of collectors 134, wherein the edit distance is determined based on analyzing the search term 180 and the search target data structure 154 of each of the index entries 136 associated with the second plurality of collectors 134. For example, the search target 150 of the second plurality of index entries 136 are determined to be the most similar to the subject search term 180 among the index entries 136 associated with the second plurality of collectors 134.

At block 290, information related to the second plurality of index entries 136 is presented, for example as described in further detail with reference to FIG. 9 block 250 and/or FIG. 10 block 274.

Figure 12:
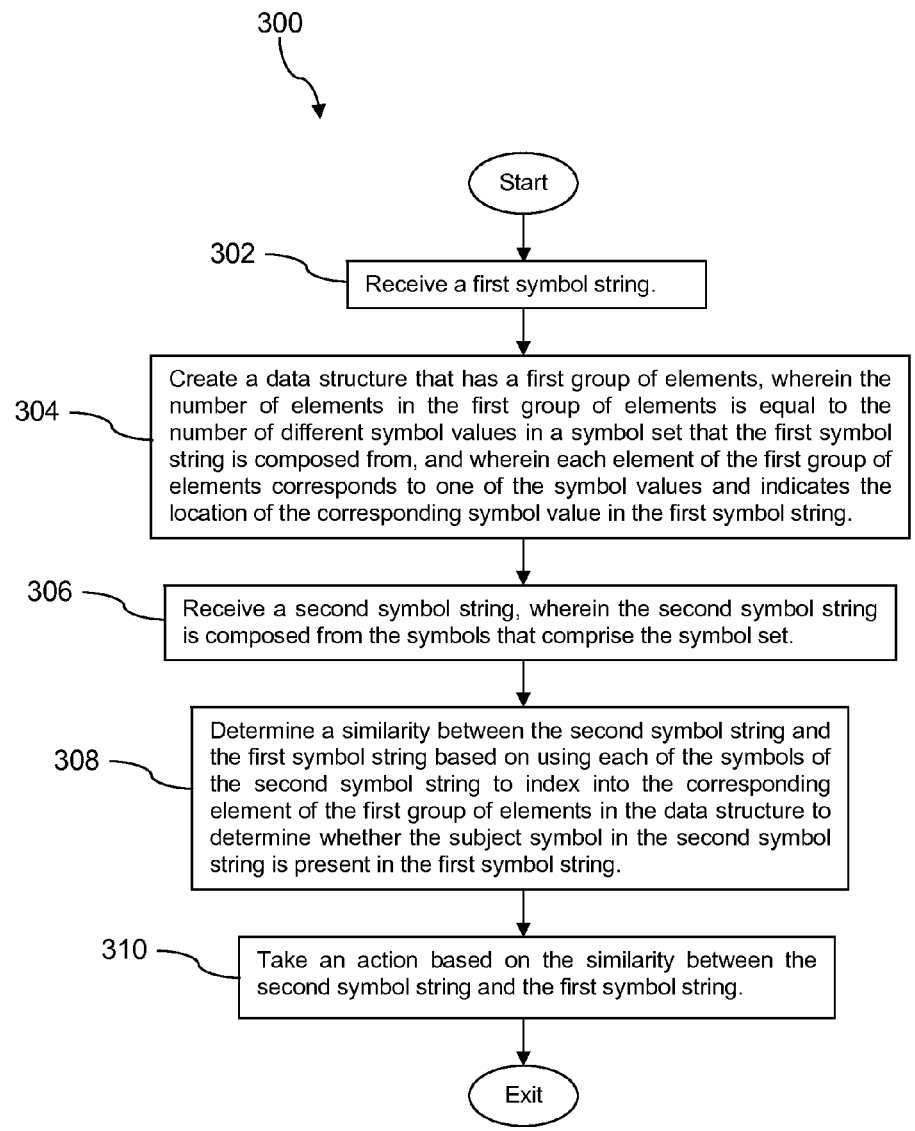
FIG. 12 is an illustration of a method according to an embodiment of the disclosure.

Turning now to FIG. 12, a method 300 is described. The method 300 may be performed by one or more applications and/or computer programs that execute on one or more computers. For example, a first application executing on a first computer may determine a similarity value and send this similarity value to a second program executing on the first computer or executing on a different second computer for further processing. At block 302, a first symbol string is received. At block 304, a data structure is created that has a first group of elements, wherein the number of elements in the first group of elements is equal to the number of different symbol values in a symbol set that the first symbol string is composed from, and wherein each element of the first group of elements corresponds to one of the symbol values and indicates the location of the corresponding symbol value in the first symbol string. The data structure may be similar to the array 204 discussed above with reference to FIG. 6.

Symbol sets were discussed further above, and it is contemplated that the method 300 may be practiced using a wide variety of different symbol sets. It is understood that the elements of the first group of elements may be arranged in any order. In an embodiment, the first group of elements may be arranged in a canonical order associated with the subject symbol set. In another embodiment, the first group of elements may be arranged in an order of frequency of occurrence of symbols of the symbol set in a domain of symbol strings to which the first and second symbol strings belong. For example, a characteristic frequency of occurrence of letters in first names of people may be different from a characteristic frequency of occurrence of letters in street addresses.

At block 306, a second symbol string is received, wherein the second symbol string is composed from the symbols that comprise the symbol set. At block 308, a similarity between the second symbol string and the first symbol string is determined based on using each of the symbols of the second symbol string to index into the corresponding element of the first group of elements in the data structure to determine whether the subject symbol in the second symbol string is present in the first symbol string. In an embodiment, the similarity between the symbol strings may be determined based on the number of symbols shared in common by the symbol strings and/or based on the relative positions of the common symbols within the symbol strings. In an embodiment, the similarity may be determined based at least in part on using a Jaro edit distance algorithm. At block 310, action is taken based on the similarity between the second symbol string and the first symbol string. For example, the first symbol string is presented on a display screen. Alternatively, the data structure may be associated with other information, and at least some of this other information may be presented on a display screen or further processed by an application.

Method 300 contemplates using the techniques discussed above with reference to FIG. 6 in other applications that may not involve partitioning of a data store of index entries based on the similarity of a symbol string in the index entry to a symbol string associated with each of the partitions.

Figure 13:
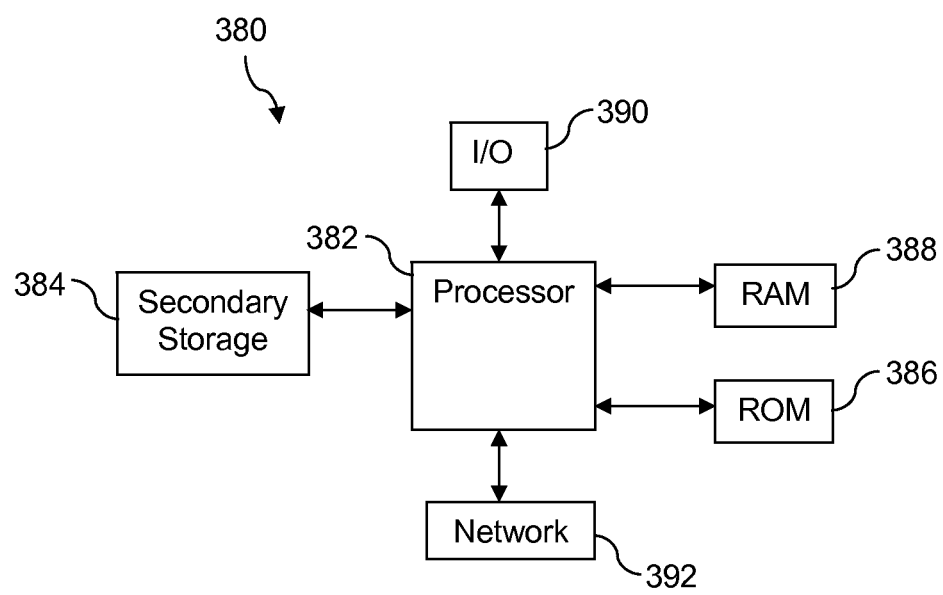
FIG. 13 illustrates an exemplary computer system suitable for implementing the several embodiments of the disclosure.

FIG. 13 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, collector ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources, which may be referred to in some contexts as elastic provisioning. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer automated partitioned search method, comprising:
    building, by an application executing on a computer, a plurality of collectors associated with a plurality of partitions, wherein each collector comprises a collector symbol string;
    associating, by an application executing on a computer, a plurality of index entries with the plurality of collectors to create an index that comprises the plurality of collectors and the plurality of index entries, wherein each index entry comprises a search target, wherein each index entry is associated with at least one of the plurality of collectors based on a similarity between the search target of the index entry and the collector symbol string of the at least one of the plurality of collectors, and wherein the similarity between the search target of the index entry and the collector symbol string of the at least one of the plurality of collectors is determined based on determining an edit distance between the search target of the index entry and the collector symbol string of the at least one of the plurality of collectors;
    subsequent to creation of the index, receiving, by an application executing on a computer, a search term;
    conducting, by an application executing on a computer, a lexicographic search using the received search term, wherein the lexicographic search includes searching structured data and comprises:
        searching each of the plurality of collectors in the index associated with the plurality of partitions;
        selecting a subset of collectors associated with a subset of partitions from among the plurality of collectors associated with the plurality of partitions based on a similarity between the received search term and the collector symbol string of each of the subset of collectors in the subset of partitions;
        searching each of the index entries in the index associated with the selected subset of collectors in the subset of partitions, but not all of the index entries associated with the plurality of collectors; and
        selecting a subset of index entries from among the index entries associated with the selected subset of collectors in the subset of partitions based on a similarity between the received search term and the search target of each of the subset of index entries; and
    presenting a plurality of information related to the selected subset of index entries.

2. The method of claim 1, wherein each index entry comprises a reference to an entry in a data store, further comprising reading the plurality of information from the data store, wherein each information is identified by the reference to the entry in the data store comprised in each of the selected subset of index entries.

3. The method of claim 1, wherein each index entry comprises an information component and the plurality of information is accessed by reading the information components of the selected subset of index entries.

4. The method of claim 1, wherein each index entry further comprises an identity of the at least one of the plurality of collectors to which the index entry is associated.

5. The method of claim 4, wherein at least one index entry comprises identities of collectors to which the index entry is associated.

6. The method of claim 1, wherein the similarity between the received search term and the collector symbol string of each of the selected subset of collectors is determined based on determining an edit distance between the received search term and the collector symbol string of each of the selected subset of collectors and the similarity between the received search term and the search target of each of the selected subset of index entries is determined based on determining an edit distance between the received search term and the search target of each of the selected subset of index entries.

7. The method of claim 1, wherein the plurality of collectors is built using a genetic algorithm, wherein the genetic algorithm comprises comparing collectors to a fitness criterion and mutating at least one of the collectors to build a new collector, where the at least one of the collectors is selected based on the comparison of the at least one of the collectors to the fitness criterion.

8. The method of claim 7, wherein the at least one of the collectors is mutated to form the new collector by randomly selecting at least one symbol in the at least one of the collectors and replacing the at least one symbol with a different symbol.

9. The method of claim 7, wherein the at least one of the collectors is mutated to form the new collector by selecting a symbol in the at least one of the collectors based on the attractive power of the symbol and replacing the selected symbol with a replacement symbol, where the replacement symbol is not present in the at least one of the collectors.

10. The method of claim 7, wherein the at least one of the collectors is mutated to form the new collector by recombining the at least one of the collectors with another collector.

11. A computer automated partitioned search method, comprising:
building, by an application executing on a computer, a first plurality of collectors associated with a first plurality of partitions, wherein each collector comprises a collector symbol string;
associating, by an application executing on a computer, a first plurality of index entries with the first plurality of collectors to create a first index, wherein each index entry comprises a search target, wherein each one of the first plurality of index entries is associated with at least one of the first plurality of collectors based on a similarity between the search target of the index entry and the collector symbol string of the at least one of the first plurality of collectors, and wherein the similarity between the search target of the index entry and the collector symbol string of the at least one of the first plurality of collectors is determined based on determining an edit distance between the search target of the index entry and the collector symbol string of the at least one of the first plurality of collectors;
in response to one of adding at least one index entry to the first index or deleting at least one index entry from the first index to create a second plurality of index entries, building, by an application executing on a computer, a second plurality of collectors associated with a second plurality of partitions using a genetic algorithm, wherein the second plurality of collectors is based on the first plurality of collectors;
associating, by an application executing on a computer, the second plurality of index entries with the second plurality of collectors to create a second index that comprises the second plurality of collectors and the second plurality of index entries, wherein each one of the second plurality of index entries is associated with at least one of the second plurality of collectors based on a similarity between the search target of the index entry and the collector symbol string of the at least one of the second plurality of collectors, and wherein the similarity between the search target of the index entry and the collector symbol string of the at least one of the second plurality of collectors is determined based on determining an edit distance between the search target of the index entry and the collector symbol string of the at least one of the second plurality of collectors;
subsequent to creation of the second index, receiving, by an application executing on a computer, a search term;
conducting, by an application executing on a computer, a lexicographic search using the received search term, wherein the lexicographic search includes searching structured data and comprises:
searching each of the second plurality of collectors in the second index associated with the second plurality of partitions;
selecting a subset of collectors associated with a subset of partitions from among the second plurality of collectors associated with the second plurality of partitions based on a similarity between the received search term and the collector symbol string of each of the subset of collectors in the subset of partitions;
searching each of the index entries in the second index associated with the selected subset of collectors in the subset of partitions, but not all of the index entries associated with the second plurality of collectors; and
selecting a subset of index entries from among the second plurality of index entries associated with the selected subset of collectors in the subset of partitions based on a similarity between the received search term and the search target of each of the subset of index entries; and
presenting information related to the selected subset of index entries.

12. The method of claim 11, wherein while associating the second plurality of index entries to the second plurality of collectors, selecting the subset of collectors partly from the first plurality of collectors.

13. A computer automated method for determining a similarity between two symbol strings, comprising:
building, by an application executing on a computer, a plurality of collectors associated with a plurality of partitions, wherein each collector comprises a collector symbol string;
associating, by an application executing on a computer, a plurality of index entries with the plurality of collectors to create an index, wherein each index entry comprises a search target, wherein each one of the plurality of index entries is associated with at least one of the plurality of collectors based on a similarity between the search target of the index entry and the collector symbol string of the at least one of the plurality of collectors, and wherein the similarity between the search target of the index entry and the collector symbol string of the at least one of the plurality of collectors is determined based on determining an edit distance between the search target of the index entry and the collector symbol string of the at least one of the first plurality of collectors;
receiving, by an application executing on a computer, a first symbol string associated with a collector of the plurality of collectors or an index entry of the plurality of index entries, wherein the first symbol string is the collector symbol string associated with the collector or the search target associated with the index entry;
during the initial creation of the collector or the index entry, creating a data structure for the collector or the index entry that has a first group of elements, wherein the number of elements in the first group of elements is equal to the number of different symbol values in a symbol set that the first symbol string is composed from, and wherein each element of the first group of elements corresponds to one of the symbol values and indicates the location of the corresponding symbol value in the first symbol string;

subsequent to creation of the index, receiving, by an application executing on a computer, a search term comprising a second symbol string, wherein the second symbol string is composed from the symbols that comprise the symbol set;

conducting, by an application executing on a computer, a lexicographic search using the received search term, wherein the lexicographic search includes searching structured data and comprises:

searching each of the plurality of collectors in the index associated with the plurality of partitions;

determining a similarity between the second symbol string and the first symbol string based on using each of the symbols of the second symbol string to index into the corresponding element of the first group of elements in the data structure to determine whether the subject symbol in the second symbol string is present in the first symbol string;

selecting a subset of collectors associated with a subset of partitions from among the plurality of collectors associated with the plurality of partitions based on a similarity between the received search term and the collector symbol string of each of the subset of collectors in the subset of partitions;

searching each of the index entries in the index associated with the selected subset of collectors in the subset of partitions, but not all of the index entries associated with the plurality of collectors; and selecting a subset of index entries from among the index entries associated with the selected subset of collectors in the subset of partitions based on a similarity between the received search term and the search target of each of the subset of index entries, wherein the selecting the subset of index entries or the selecting the subset of collectors is in response to the determining the similarity between the second symbol string and the first symbol string; and presenting a plurality of information related to the selected subset of index entries including information related to the first symbol on a display screen.

14. The method of claim 13, further comprising providing a similarity metric value to a second application executing on a computer.

15. The method of claim 13, wherein determining the similarity between the second symbol string and the first symbol string is based at least in part on determining how many symbols present in the second symbol string are present in the first symbol string.

16. The method of claim 15, wherein determining the similarity between the second symbol string and the first symbol string is further based at least in part on comparing a position of a first symbol in the second symbol string to a position of the first symbol in the first symbol string.

17. The method of claim 13, wherein determining the similarity between the second symbol string and the first symbol string is based at least in part on determining a Jaro distance between the second symbol string and the first symbol string.

18. The method of claim 13, wherein the elements in the first group of elements are arranged in a canonical order of the symbol set.

19. The method of claim 13, wherein the elements in the first group of elements are arranged in an order of frequency of occurrence of symbols of the symbol set in a domain of symbol strings to which the first symbol string and the second symbol string belong.

* * * * *